United States Patent
Matula et al.

(10) Patent No.: US 11,316,979 B2
(45) Date of Patent: Apr. 26, 2022

(54) DETECTING VOCABULARY SKILL LEVEL AND CORRECTING MISALIGNMENT IN REMOTE INTERACTIONS

(71) Applicant: Avaya Management L.P., Santa Clara, CA (US)

(72) Inventors: Valentine C. Matula, Granville, OH (US); Manish Negi, Pune (IN); Divakar Kumar Ray, Pune (IN); David Chavez, Broomfield, CO (US)

(73) Assignee: Avaya Management L.P., Santa Clara, CA (US)

( * ) Notice: Subject to any disclaimer, the term of this patent is extended or adjusted under 35 U.S.C. 154(b) by 0 days.

(21) Appl. No.: 16/984,724

(22) Filed: Aug. 4, 2020

(65) Prior Publication Data

US 2022/0046132 A1    Feb. 10, 2022

(51) Int. Cl.
| | | |
|---|---|---|
| *H04M 3/523* | (2006.01) | |
| *G06N 3/08* | (2006.01) | |
| *G10L 15/06* | (2013.01) | |
| *G10L 15/16* | (2006.01) | |
| *H04M 3/51* | (2006.01) | |
| *G10L 15/19* | (2013.01) | |

(52) U.S. Cl.
CPC ............ *H04M 3/5233* (2013.01); *G06N 3/08* (2013.01); *G10L 15/063* (2013.01); *G10L 15/16* (2013.01); *G10L 15/19* (2013.01); *H04M 3/5166* (2013.01)

(58) Field of Classification Search
CPC .... H04M 3/5233; G10L 15/063; G10L 15/19; G06N 3/08

USPC ............ 379/265.12, 265.11, 265.05, 265.01, 379/265.02, 266.1
See application file for complete search history.

(56) References Cited

U.S. PATENT DOCUMENTS

| | | | |
|---|---|---|---|
| 6,847,714 B2 | 1/2005 | Das et al. | |
| 8,411,841 B2 | 4/2013 | Edwards et al. | |
| 8,634,543 B2 | 1/2014 | Flockhart et al. | |
| 9,479,643 B1 | 10/2016 | Abuelsaad et al. | |
| 2010/0235218 A1 | 9/2010 | Erhart et al. | |
| 2010/0296417 A1 | 11/2010 | Steiner | |
| 2011/0125793 A1 | 5/2011 | Erhart et al. | |
| 2011/0125826 A1 | 5/2011 | Erhart et al. | |
| 2014/0270143 A1* | 9/2014 | Upadhyaya | H04M 3/5233 379/265.12 |

(Continued)

OTHER PUBLICATIONS

"ACTFL Proficiency Guidelines 2012," ACTFL, Inc., 2012, 24 pages.

(Continued)

*Primary Examiner* — Thjuan K Addy
(74) *Attorney, Agent, or Firm* — Sheridan Ross P.C.

(57) ABSTRACT

In order to provide effective communications, the individuals engaged in the communication should have appropriately matched language proficiencies. By ensuring that a customer of a contact center is matched with an agent having, or presenting, content of a communication utilizing language proficiency appropriate for the customer, effective communications may be provided. Should an agent deviate and provide communication content having language proficiency that is misaligned with the customer, automatic corrective action may be taken to realign the language proficiency presented to the customer.

20 Claims, 7 Drawing Sheets

(56) References Cited

U.S. PATENT DOCUMENTS

2016/0036980 A1* 2/2016 Ristock .............. H04M 3/5166
379/265.12
2016/0117628 A1* 4/2016 Brophy ................. G06F 40/47
704/2

OTHER PUBLICATIONS

"EF SET Academic and Technical Development Report," EF Education First Ltd., Sep. 2014, 79 pages.
"The Interagency Language Roundtable (ILR) Scale (Language Proficiency Assessment)," Case Western Reserve University, available Aug. 30, 2017, 3 pages [retrieved online from: https://web.archive.org/web/20170830013617/http://casemed.case.edu/registrar/pdfs/Scale_ILR.pdf].

* cited by examiner

DETECTING VOCABULARY SKILL LEVEL AND CORRECTING MISALIGNMENT IN REMOTE INTERACTIONS

COPYRIGHT NOTICE

A portion of the disclosure of this patent document contains material that is subject to copyright protection. The copyright owner has not objected to the facsimile reproduction by anyone of the patent document or the patent disclosure as it appears in the Patent and Trademark Office patent files or records, but otherwise reserves all copyright rights whatsoever.

FIELD OF THE DISCLOSURE

The invention relates generally to systems and methods for routing communications to a selected node on a network and particularly to routing to a node wherein the node-to-node communication includes homogeneous communication content.

BACKGROUND

Contact centers strive to match customers with agents having the appropriate skills to both communicate with the customer effectively and address the purpose of the interaction. Human communication is complex and may face difficulty due to any number of factors. Certain attributes may cause an interaction to fail outright, such as when an agent and customer do not have a common language. Such failures are rare as contact centers have mechanisms to ascertain a language of the customer and only connecting the customer to an agent having sufficient skills in that language, whether written or spoken.

Even when communicating in a common language, miscommunications and misunderstandings may still occur. As a result, communications often comprise periods of time determining if a misunderstanding has occurred, recovering from an unaddressed misunderstanding, and clarifying or otherwise resolving the misunderstanding. Therefore, beyond the selection of a particular language to be used in a communication, improving communication effectiveness promotes a better understanding between the customer and agent reduces human, computing, and network resources such as to address the issues at hand more quickly and allow resources to be conserved for other tasks.

Individuals are known to communicate with varying degrees of language proficiency. Language proficiency has measurable criteria and benchmarks to determine a particular degree or scoring for an individual with respect to speaking, writing, listening, and/or reading. Various standards are provided by which proficiency may be measured and scored, including, by not limited to: American Council on the Teaching of Foreign Languages (ACTFL) (https://www.actfl.org/) and the ACTFL Proficiency Guidelines 2012 (available at https://preprod.actfl.org/resources/actfl-proficiency-guidelines-2012); Academic and Technical Development Report September 2014, "EF Standard English Test" (EF SET) (available at: https://www.efset.org/cefr/); and The Interagency Language Roundtable (ILR) (https://www.govtilr.org/index.htm) and The Interagency Language Roundtable (ILR) Scale (Language Proficiency Assessment), which is separated into: Speaking (available at: https://www.govtilr.org/Skills/ILRscale2.htm), Listening (available at: https://www.govtilr.org/Skills/ILRscale3.htm), Reading (available at: https://www.govtilr.org/Skills/ILRscale4.htm), Writing (available at: https://www.govtilr.org/Skills/ILRscale5.htm), Translation (available at: https://www.govtilr.org/Skills/AdoptedILRTranslation-Guidelines.htm), Interpretation (available at: https://www.govtilr.org/Skills/interpretationSLDsapproved.htm) and the Interagency Language Roundtable (ILR) Scale (Language Proficiency Assessment) (available at: https://web.archive.org/web/20190805192532/http://casemed.case.edu/registrar/pdfs/Scale_ILR.pdf). Each of the foregoing standards and methodologies are incorporated herein by reference for all that they teach.

As one example of a standard, the ACTFL Proficiency Guidelines are a description of what individuals can do with language in terms of speaking, writing, listening, and reading in real-world situations in a spontaneous and non-rehearsed context. For each skill, these guidelines identify five major levels of proficiency: Distinguished, Superior, Advanced, Intermediate, and Novice. The major levels Advanced, Intermediate, and Novice are subdivided into High, Mid, and Low sublevels. The levels of the ACTFL Guidelines describe the continuum of proficiency from that of the highly articulate, well-educated language user to a level of little or no functional ability.

These Guidelines present the levels of proficiency as ranges, and describe what an individual can and cannot do with language at each level, regardless of where, when, or how the language was acquired. Together these levels form a hierarchy in which each level subsumes all lower levels. The Guidelines are not based on any particular theory, pedagogical method, or educational curriculum. They neither describe how an individual learns a language nor prescribe how an individual should learn a language, and they should not be used for such purposes. They are an instrument for the evaluation of functional language ability.

The ACTFL Proficiency Guidelines were first published in 1986 as an adaptation for the academic community of the U.S. Government's Interagency Language Roundtable (ILR) Skill Level Descriptions. This third edition marks the third edition of the ACTFL Proficiency Guidelines includes the first revisions of Listening and Reading since their original publication in 1986, and a second revision of the ACTFL Speaking and Writing Guidelines, which were revised to reflect real-world assessment needs in 1999 and 2001 respectively. New for the 2012 edition are the addition of the major level of Distinguished to the Speaking and Writing Guidelines, the division of the Advanced level into the three sublevels of High, Mid, and Low for the Listening and Reading Guidelines and the addition of general level description at the Advanced, Intermediate, and Novice levels for all skills.

Another new feature of the 2012 Guidelines is their publication online, supported with glossed terminology and annotated, multimedia samples of performance at each level for Speaking and Writing, and examples of oral and written texts and tasks associated with each level for Reading and Listening.

The direct application of the ACTFL Proficiency Guidelines is for the evaluation of functional language ability. The Guidelines are intended to be used for global assessment in academic and workplace settings. However, the Guidelines do have instructional implications. The ACTFL Proficiency Guidelines underlie the development of the ACTFL Performance Guidelines for K-12 Learners (1998) and are used in conjunction with the National Standards for Foreign Language Learning (1996, 1998, 2006) to describe how well students meet content standards. For the past 25 years, the ACTFL Guidelines have had an increasingly profound impact on foreign language teaching and learning in the United States.

ACTFL: Distinguished (Speaking)

Speakers at the Distinguished level are able to use language skillfully, and with accuracy, efficiency, and effectiveness. They are educated and articulate users of the language. They can reflect on a wide range of global issues and highly abstract concepts in a culturally appropriate manner. Distinguished-level speakers can use persuasive and hypothetical discourse for representational purposes, allowing them to advocate a point of view that is not necessarily their own. They can tailor language to a variety of audiences by adapting their speech and register in ways that are culturally authentic.

Speakers at the Distinguished level produce highly sophisticated and tightly organized extended discourse. At the same time, they can speak succinctly, often using cultural and historical references to allow them to say less and mean more. At this level, oral discourse typically resembles written discourse.

A non-native accent, a lack of a native-like economy of expression, a limited control of deeply embedded cultural references, and/or an occasional isolated language error may still be present at this level.

ACTFL: Superior (Speaking)

Speakers at the Superior level are able to communicate with accuracy and fluency in order to participate fully and effectively in conversations on a variety of topics in formal and informal settings from both concrete and abstract perspectives. They discuss their interests and special fields of competence, explain complex matters in detail, and provide lengthy and coherent narrations, all with ease, fluency, and accuracy. They present their opinions on a number of issues of interest to them, such as social and political issues, and provide structured arguments to support these opinions. They are able to construct and develop hypotheses to explore alternative possibilities.

When appropriate, these speakers use extended discourse without unnaturally lengthy hesitation to make their point, even when engaged in abstract elaborations. Such discourse, while coherent, may still be influenced by language patterns other than those of the target language. Superior-level speakers employ a variety of interactive and discourse strategies, such as turn-taking and separating main ideas from supporting information through the use of syntactic, lexical, and phonetic devices.

Speakers at the Superior level demonstrate no pattern of error in the use of basic structures, although they may make sporadic errors, particularly in low-frequency structures and in complex high-frequency structures. Such errors, if they do occur, do not distract the native interlocutor or interfere with communication.

ACTFL: Advanced (Speaking)

Speakers at the Advanced level engage in conversation in a clearly participatory manner in order to communicate information on autobiographical topics, as well as topics of community, national, or international interest. The topics are handled concretely by means of narration and description in the major times frames of past, present, and future. These speakers can also deal with a social situation with an unexpected complication. The language of Advanced-level speakers is abundant, the oral paragraph being the measure of Advanced-level length and discourse. Advanced-level speakers have sufficient control of basic structures and generic vocabulary to be understood by native speakers of the language, including those unaccustomed to non-native speech.

Advanced High:

Speakers at the Advanced High sublevel perform all Advanced-level tasks with linguistic ease, confidence, and competence. They are consistently able to explain in detail and narrate fully and accurately in all time frames. In addition, Advanced High speakers handle the tasks pertaining to the Superior level but cannot sustain performance at that level across a variety of topics. They may provide a structured argument to support their opinions, and they may construct hypotheses, but patterns of error appear. They can discuss some topics abstractly, especially those relating to their particular interests and special fields of expertise, but in general, they are more comfortable discussing a variety of topics concretely.

Advanced High speakers may demonstrate a well-developed ability to compensate for an imperfect grasp of some forms or for limitations in vocabulary by the confident use of communicative strategies, such as paraphrasing, circumlocution, and illustration. They use precise vocabulary and intonation to express meaning and often show great fluency and ease of speech. However, when called on to perform the complex tasks associated with the Superior level over a variety of topics, their language will at times break down or prove inadequate, or they may avoid the task altogether, for example, by resorting to simplification through the use of description or narration in place of argument or hypothesis.

Advanced Mid:

Speakers at the Advanced Mid sublevel are able to handle with ease and confidence a large number of communicative tasks. They participate actively in most informal and some formal exchanges on a variety of concrete topics relating to work, school, home, and leisure activities, as well as topics relating to events of current, public, and personal interest or individual relevance.

Advanced Mid speakers demonstrate the ability to narrate and describe in the major time frames of past, present, and future by providing a full account, with good control of aspect. Narration and description tend to be combined and interwoven to relate relevant and supporting facts in connected, paragraph-length discourse.

Advanced Mid speakers can handle successfully and with relative ease the linguistic challenges presented by a complication or unexpected turn of events that occurs within the context of a routine situation or communicative task with which they are otherwise familiar. Communicative strategies such as circumlocution or rephrasing are often employed for this purpose. The speech of Advanced Mid speakers performing Advanced-level tasks is marked by substantial flow. Their vocabulary is fairly extensive although primarily generic in nature, except in the case of a particular area of specialization or interest. Their discourse may still reflect the oral paragraph structure of their own language rather than that of the target language.

Advanced Mid speakers contribute to conversations on a variety of familiar topics, dealt with concretely, with much accuracy, clarity and precision, and they convey their intended message without misrepresentation or confusion. They are readily understood by native speakers unaccustomed to dealing with non-natives. When called on to perform functions or handle topics associated with the Superior level, the quality and/or quantity of their speech will generally decline.

Advanced Low:

Speakers at the Advanced Low sublevel are able to handle a variety of communicative tasks. They are able to participate in most informal and some formal conversations on topics related to school, home, and leisure activities. They can also speak about some topics related to employment, current events, and matters of public and community interest.

Advanced Low speakers demonstrate the ability to narrate and describe in the major time frames of past, present, and future in paragraph-length discourse with some control of aspect. In these narrations and descriptions, Advanced Low speakers combine and link sentences into connected discourse of paragraph length, although these narrations and descriptions tend to be handled separately rather than interwoven. They can handle appropriately the essential linguistic challenges presented by a complication or an unexpected turn of events.

Responses produced by Advanced Low speakers are typically not longer than a single paragraph. The speaker's dominant language may be evident in the use of false cognates, literal translations, or the oral paragraph structure of that language. At times their discourse may be minimal for the level, marked by an irregular flow, and containing noticeable self-correction. More generally, the performance of Advanced Low speakers tends to be uneven.

Advanced Low speech is typically marked by a certain grammatical roughness (e.g., inconsistent control of verb endings), but the overall performance of the Advanced-level tasks is sustained, albeit minimally. The vocabulary of Advanced Low speakers often lacks specificity. Nevertheless, Advanced Low speakers are able to use communicative strategies such as rephrasing and circumlocution.

Advanced Low speakers contribute to the conversation with sufficient accuracy, clarity, and precision to convey their intended message without misrepresentation or confusion. Their speech can be understood by native speakers unaccustomed to dealing with non-natives, even though this may require some repetition or restatement. When attempting to perform functions or handle topics associated with the Superior level, the linguistic quality and quantity of their speech will deteriorate significantly.

ACTFL: Intermediate (Speaking)

Speakers at the Intermediate level are distinguished primarily by their ability to create with the language when talking about familiar topics related to their daily life. They are able to recombine learned material in order to express personal meaning. Intermediate-level speakers can ask simple questions and can handle a straightforward survival situation. They produce sentence-level language, ranging from discrete sentences to strings of sentences, typically in present time. Intermediate-level speakers are understood by interlocutors who are accustomed to dealing with non-native learners of the language.

Intermediate High:

Intermediate High speakers are able to converse with ease and confidence when dealing with the routine tasks and social situations of the Intermediate level. They are able to handle successfully uncomplicated tasks and social situations requiring an exchange of basic information related to their work, school, recreation, particular interests, and areas of competence.

Intermediate High speakers can handle a substantial number of tasks associated with the Advanced level, but they are unable to sustain performance of all of these tasks all of the time. Intermediate High speakers can narrate and describe in all major time frames using connected discourse of paragraph length, but not all the time. Typically, when Intermediate High speakers attempt to perform Advanced-level tasks, their speech exhibits one or more features of breakdown, such as the failure to carry out fully the narration or description in the appropriate major time frame, an inability to maintain paragraph-length discourse, or a reduction in breadth and appropriateness of vocabulary.

Intermediate High speakers can generally be understood by native speakers unaccustomed to dealing with non-natives, although interference from another language may be evident (e.g., use of code-switching, false cognates, literal translations), and a pattern of gaps in communication may occur.

Intermediate Mid:

Speakers at the Intermediate Mid sublevel are able to handle successfully a variety of uncomplicated communicative tasks in straightforward social situations. Conversation is generally limited to those predictable and concrete exchanges necessary for survival in the target culture. These include personal information related to self, family, home, daily activities, interests and personal preferences, as well as physical and social needs, such as food, shopping, travel, and lodging.

Intermediate Mid speakers tend to function reactively, for example, by responding to direct questions or requests for information. However, they are capable of asking a variety of questions when necessary to obtain simple information to satisfy basic needs, such as directions, prices, and services. When called on to perform functions or handle topics at the Advanced level, they provide some information but have difficulty linking ideas, manipulating time and aspect, and using communicative strategies, such as circumlocution.

Intermediate Mid speakers are able to express personal meaning by creating with the language, in part by combining and recombining known elements and conversational input to produce responses typically consisting of sentences and strings of sentences. Their speech may contain pauses, reformulations, and self-corrections as they search for adequate vocabulary and appropriate language forms to express themselves. In spite of the limitations in their vocabulary and/or pronunciation and/or grammar and/or syntax, Intermediate Mid speakers are generally understood by sympathetic interlocutors accustomed to dealing with non-natives.

Overall, Intermediate Mid speakers are at ease when performing Intermediate-level tasks and do so with significant quantity and quality of Intermediate-level language.

Intermediate Low:

Speakers at the Intermediate Low sublevel are able to handle successfully a limited number of uncomplicated communicative tasks by creating with the language in straightforward social situations. Conversation is restricted to some of the concrete exchanges and predictable topics necessary for survival in the target-language culture. These topics relate to basic personal information; for example, self and family, some daily activities and personal preferences, and some immediate needs, such as ordering food and making simple purchases. At the Intermediate Low sublevel, speakers are primarily reactive and struggle to answer direct questions or requests for information. They are also able to ask a few appropriate questions. Intermediate Low speakers manage to sustain the functions of the Intermediate level, although just barely.

Intermediate Low speakers express personal meaning by combining and recombining what they know and what they hear from their interlocutors into short statements and discrete sentences. Their responses are often filled with hesitancy and inaccuracies as they search for appropriate linguistic forms and vocabulary while attempting to give form to the message. Their speech is characterized by frequent pauses, ineffective reformulations and self-corrections. Their pronunciation, vocabulary, and syntax are strongly influenced by their first language. In spite of frequent misunderstandings that may require repetition or rephrasing, Intermediate Low speakers can generally be understood by sympathetic interlocutors, particularly by those accustomed to dealing with non-natives.

ACTFL: Novice (Speaking)

Novice-level speakers can communicate short messages on highly predictable, everyday topics that affect them directly. They do so primarily through the use of isolated words and phrases that have been encountered, memorized, and recalled. Novice-level speakers may be difficult to understand even by the most sympathetic interlocutors accustomed to non-native speech.

Novice High:

Speakers at the Novice High sublevel are able to handle a variety of tasks pertaining to the Intermediate level, but are unable to sustain performance at that level. They are able to manage successfully a number of uncomplicated communicative tasks in straightforward social situations. Conversation is restricted to a few of the predictable topics necessary for survival in the target language culture, such as basic personal information, basic objects, and a limited number of activities, preferences, and immediate needs. Novice High speakers respond to simple, direct questions or requests for information. They are also able to ask a few formulaic questions. Novice High speakers are able to express personal meaning by relying heavily on learned phrases or recombinations of these and what they hear from their interlocutor. Their language consists primarily of short and sometimes incomplete sentences in the present, and may be hesitant or inaccurate. On the other hand, since their language often consists of expansions of learned material and stock phrases, they may sometimes sound surprisingly fluent and accurate. Pronunciation, vocabulary, and syntax may be strongly influenced by the first language. Frequent misunderstandings may arise but, with repetition or rephrasing, Novice High speakers can generally be understood by sympathetic interlocutors used to non-natives. When called on to handle a variety of topics and perform functions pertaining to the Intermediate level, a Novice High speaker can sometimes respond in intelligible sentences, but will not be able to sustain sentence-level discourse.

Novice Mid:

Speakers at the Novice Mid sublevel communicate minimally by using a number of isolated words and memorized phrases limited by the particular context in which the language has been learned. When responding to direct questions, they may say only two or three words at a time or give an occasional stock answer. They pause frequently as they search for simple vocabulary or attempt to recycle their own and their interlocutor's words. Novice Mid speakers may be understood with difficulty even by sympathetic interlocutors accustomed to dealing with non-natives. When called on to handle topics and perform functions associated with the Intermediate level, they frequently resort to repetition, words from their native language, or silence.

Novice Low:

Speakers at the Novice Low sublevel have no real functional ability and, because of their pronunciation, may be unintelligible. Given adequate time and familiar cues, they may be able to exchange greetings, give their identity, and name a number of familiar objects from their immediate environment. They are unable to perform functions or handle topics pertaining to the Intermediate level, and cannot therefore participate in a true conversational exchange.

ACTFL: Distinguished (Writing)

Writers at the Distinguished level can carry out formal writing tasks such as official correspondence, position papers, and journal articles. They can write analytically on professional, academic and societal issues. In addition, Distinguished-level writers are able to address world issues in a highly conceptualized fashion.

These writers can use persuasive and hypothetical discourse as representational techniques, allowing them to advocate a position that is not necessarily their own. They are also able to communicate subtlety and nuance. Distinguished-level writing is sophisticated and is directed to sophisticated readers. Writers at this level write to their audience; they tailor their language to their readers.

Distinguished-level writing is dense and complex; yet, it is characterized by an economy of expression. The writing is skillfully crafted and is organized in a way that reflects target-culture thought patterns. At the Distinguished level, length is not a determining factor. Distinguished-level texts can be as short as a poem or as long as a treatise.

Writers at the Distinguished level demonstrate control of complex lexical, grammatical, syntactic, and stylistic features of the language. Discourse structure and punctuation are used strategically, not only to organize meaning but also to enhance it. Conventions are generally appropriate to the text modality and the target culture.

ACTFL: Superior (Writing):

Writers at the Superior level are able to produce most kinds of formal and informal correspondence, in-depth summaries, reports, and research papers on a variety of social, academic, and professional topics. Their treatment of these issues moves beyond the concrete to the abstract.

Writers at the Superior level demonstrate the ability to explain complex matters, and to present and support opinions by developing cogent arguments and hypotheses. Their treatment of the topic is enhanced by the effective use of structure, lexicon, and writing protocols. They organize and prioritize ideas to convey to the reader what is significant. The relationship among ideas is consistently clear, due to organizational and developmental principles (e.g., cause and effect, comparison, chronology). These writers are capable of extended treatment of a topic which typically requires at least a series of paragraphs, but can extend to a number of pages.

Writers at the Superior level demonstrate a high degree of control of grammar and syntax, of both general and specialized/professional vocabulary, of spelling or symbol production, of cohesive devices, and of punctuation. Their vocabulary is precise and varied. Writers at this level direct their writing to their audiences; their writing fluency eases the reader's task.

Writers at the Superior level do not typically control target-language cultural, organizational, or stylistic patterns. At the Superior level, writers demonstrate no pattern of error; however, occasional errors may occur, particularly in low-frequency structures. When present, these errors do not interfere with comprehension, and they rarely distract the native reader.

ACTFL: Advanced (Writing)

Writers at the Advanced level are characterized by the ability to write routine informal and some formal correspondence, as well as narratives, descriptions, and summaries of a factual nature. They can narrate and describe in the major time frames of past, present, and future, using paraphrasing and elaboration to provide clarity. Advanced-level writers produce connected discourse of paragraph length and structure. At this level, writers show good control of the most frequently used structures and generic vocabulary, allowing them to be understood by those unaccustomed to the writing of non-natives.

Advanced High:

Writers at the Advanced High sublevel are able to write about a variety of topics with significant precision and detail. They can handle informal and formal correspondence according to appropriate conventions. They can write summaries and reports of a factual nature. They can also write extensively about topics relating to particular interests and special areas of competence, although their writing tends to emphasize the concrete aspects of such topics. Advanced High writers can narrate and describe in the major time frames, with solid control of aspect. In addition, they are able to demonstrate the ability to handle writing tasks associated with the Superior level, such as developing arguments and constructing hypotheses, but are not able to do this all of the time; they cannot produce Superior-level writing consistently across a variety of topics treated abstractly or generally. They have good control of a range of grammatical structures and a fairly wide general vocabulary. When writing at the Advanced level, they often show remarkable ease of expression, but under the demands of Superior-level writing tasks, patterns of error appear. The linguistic limitations of Advanced High writing may occasionally distract the native reader from the message.

Advanced Mid:

Writers at the Advanced Mid sublevel are able to meet a range of work and/or academic writing needs. They demonstrate the ability to narrate and describe with detail in all major time frames with good control of aspect. They are able to write straightforward summaries on topics of general interest. Their writing exhibits a variety of cohesive devices in texts up to several paragraphs in length. There is good control of the most frequently used target-language syntactic structures and a range of general vocabulary. Most often, thoughts are expressed clearly and supported by some elaboration. This writing incorporates organizational features both of the target language and the writer's first language and may at times resemble oral discourse. Writing at the Advanced Mid sublevel is understood readily by natives not used to the writing of non-natives. When called on to perform functions or to treat issues at the Superior level, Advanced Mid writers will manifest a decline in the quality and/or quantity of their writing.

Advanced Low:

Writers at the Advanced Low sublevel are able to meet basic work and/or academic writing needs. They demonstrate the ability to narrate and describe in major time frames with some control of aspect. They are able to compose simple summaries on familiar topics. Advanced Low writers are able to combine and link sentences into texts of paragraph length and structure. Their writing, while adequate to satisfy the criteria of the Advanced level, may not be substantive. Writers at the Advanced Low sublevel demonstrate the ability to incorporate a limited number of cohesive devices, and may resort to some redundancy and awkward repetition. They rely on patterns of oral discourse and the writing style of their first language. These writers demonstrate minimal control of common structures and vocabulary associated with the Advanced level. Their writing is understood by natives not accustomed to the writing of non-natives, although some additional effort may be required in the reading of the text. When attempting to perform functions at the Superior level, their writing will deteriorate significantly.

ACTFL: Intermediate (Writing):

Writers at the Intermediate level are characterized by the ability to meet practical writing needs, such as simple messages and letters, requests for information, and notes. In addition, they can ask and respond to simple questions in writing. These writers can create with the language and communicate simple facts and ideas in a series of loosely connected sentences on topics of personal interest and social needs. They write primarily in present time. At this level, writers use basic vocabulary and structures to express meaning that is comprehensible to those accustomed to the writing of non-natives.

Intermediate High:

Writers at the Intermediate High sublevel are able to meet all practical writing needs of the Intermediate level. Additionally, they can write compositions and simple summaries related to work and/or school experiences. They can narrate and describe in different time frames when writing about everyday events and situations. These narrations and descriptions are often but not always of paragraph length, and they typically contain some evidence of breakdown in one or more features of the Advanced level. For example, these writers may be inconsistent in the use of appropriate major time markers, resulting in a loss of clarity. The vocabulary, grammar, and style of Intermediate High writers essentially correspond to those of the spoken language. Intermediate High writing, even with numerous and perhaps significant errors, is generally comprehensible to natives not used to the writing of non-natives, but there are likely to be gaps in comprehension.

Intermediate Mid:

Writers at the Intermediate Mid sublevel are able to meet a number of practical writing needs. They can write short, simple communications, compositions, and requests for information in loosely connected texts about personal preferences, daily routines, common events, and other personal topics. Their writing is framed in present time but may contain references to other time frames. The writing style closely resembles oral discourse. Writers at the Intermediate Mid sublevel show evidence of control of basic sentence structure and verb forms. This writing is best defined as a collection of discrete sentences and/or questions loosely strung together. There is little evidence of deliberate organization. Intermediate Mid writers can be understood readily by natives used to the writing of non-natives. When Intermediate Mid writers attempt Advanced-level writing tasks, the quality and/or quantity of their writing declines and the message may be unclear.

Intermediate Low:

Writers at the Intermediate Low sublevel are able to meet some limited practical writing needs. They can create statements and formulate questions based on familiar material. Most sentences are recombinations of learned vocabulary and structures. These are short and simple conversational-style sentences with basic word order. They are written almost exclusively in present time. Writing tends to consist of a few simple sentences, often with repetitive structure. Topics are tied to highly predictable content areas and personal information. Vocabulary is adequate to express elementary needs. There may be basic errors in grammar, word choice, punctuation, spelling, and in the formation and use of non-alphabetic symbols. Their writing is understood by natives used to the writing of non-natives, although additional effort may be required. When Intermediate Low writers attempt to perform writing tasks at the Advanced level, their writing will deteriorate significantly, and their message may be left incomplete.

ACTFL: Novice (Writing):

Writers at the Novice level are characterized by the ability to produce lists and notes, primarily by writing words and phrases. They can provide limited formulaic information on simple forms and documents. These writers can reproduce practiced material to convey the simplest messages. In addition, they can transcribe familiar words or phrases, copy letters of the alphabet or syllables of a syllabary, or reproduce basic characters with some accuracy.

Novice High:

Writers at the Novice High sublevel are able to meet limited basic practical writing needs using lists, short messages, postcards, and simple notes. They are able to express themselves within the context in which the language was learned, relying mainly on practiced material. Their writing is focused on common elements of daily life. Novice High writers are able to recombine learned vocabulary and structures to create simple sentences on very familiar topics, but are not able to sustain sentence-level writing all the time. Due to inadequate vocabulary and/or grammar, writing at this level may only partially communicate the intentions of the writer. Novice High writing is often comprehensible to natives used to the writing of non-natives, but gaps in comprehension may occur.

Novice Mid:

Writers at the Novice Mid sublevel can reproduce from memory a modest number of words and phrases in context. They can supply limited information on simple forms and documents, and other basic biographical information, such as names, numbers, and nationality. Novice Mid writers exhibit a high degree of accuracy when writing on well-practiced, familiar topics using limited formulaic language. With less familiar topics, there is a marked decrease in accuracy. Errors in spelling or in the representation of symbols may be frequent. There is little evidence of functional writing skills. At this level, the writing may be difficult to understand even by those accustomed to non-native writers.

Novice Low:

Writers at the Novice Low sublevel are able to copy or transcribe familiar words or phrases, form letters in an alphabetic system, and copy and produce isolated, basic strokes in languages that use syllabaries or characters. Given adequate time and familiar cues, they can reproduce from memory a very limited number of isolated words or familiar phrases, but errors are to be expected.

ACTFL: Distinguished (Listening):

At the Distinguished level, listeners can understand a wide variety of forms, styles, and registers of speech on highly specialized topics in language that is tailored to different audiences. Listeners at the Distinguished level can understand language such as that found in classical theater, art films, professional symposia, academic debates, public policy statements, literary readings, and most jokes and puns. They are able to comprehend implicit and inferred information, tone, and point of view, and can follow highly persuasive arguments. They are able to understand unpredictable turns of thought related to sophisticated topics. In addition, their listening ability is enhanced by a broad and deep understanding of cultural references and allusions. Listeners at the Distinguished level are able to appreciate the richness of the spoken language.

Distinguished-level listeners understand speech that can be highly abstract, highly technical, or both, as well as speech that contains very precise, often low-frequency vocabulary and complex rhetorical structures. At this level, listeners comprehend oral discourse that is lengthy and dense, structurally complex, rich in cultural reference, idiomatic and colloquial. In addition, listeners at this level can understand information that is subtle or highly specialized, as well as the full cultural significance of very short texts with little or no linguistic redundancy.

Distinguished-level listeners comprehend language from within the cultural framework and are able to understand a speaker's use of nuance and subtlety. However, they may still have difficulty fully understanding certain dialects and nonstandard varieties of the language.

ACTFL: Superior (Listening):

At the Superior level, listeners are able to understand speech in a standard dialect on a wide range of familiar and less familiar topics. They can follow linguistically complex extended discourse such as that found in academic and professional settings, lectures, speeches and reports. Comprehension is no longer limited to the listener's familiarity with subject matter, but also comes from a command of the language that is supported by a broad vocabulary, an understanding of more complex structures and linguistic experience within the target culture. Superior listeners can understand not only what is said, but sometimes what is left unsaid; that is, they can make inferences.

Superior-level listeners understand speech that typically uses precise, specialized vocabulary and complex grammatical structures. This speech often deals abstractly with topics in a way that is appropriate for academic and professional audiences. It can be reasoned and can contain cultural references.

ACTFL: Advanced (Listening):

At the Advanced level, listeners can understand the main ideas and most supporting details in connected discourse on a variety of general interest topics, such as news stories, explanations, instructions, anecdotes, or travelogue descriptions. Listeners are able to compensate for limitations in their lexical and structural control of the language by using real-world knowledge and contextual clues. Listeners may also derive some meaning from oral texts at higher levels if they possess significant familiarity with the topic or context.

Advanced-level listeners understand speech that is authentic and connected. This speech is lexically and structurally uncomplicated. The discourse is straightforward and is generally organized in a clear and predictable way.

Advanced-level listeners demonstrate the ability to comprehend language on a range of topics of general interest. They have sufficient knowledge of language structure to understand basic time-frame references. Nevertheless, their understanding is most often limited to concrete, conventional discourse.

Advanced High:

At the Advanced High sublevel, listeners are able to understand, with ease and confidence, conventional narrative and descriptive texts of any length as well as complex factual material such as summaries or reports. They are typically able to follow some of the essential points of more complex or argumentative speech in areas of special interest or knowledge. In addition, they are able to derive some meaning from oral texts that deal with unfamiliar topics or situations. At the Advanced High sublevel, listeners are able to comprehend the facts presented in oral discourse and are often able to recognize speaker-intended inferences. Nevertheless, there are likely to be gaps in comprehension of complex texts dealing with issues treated abstractly that are typically understood by Superior-level listeners.

Advanced Mid:

At the Advanced Mid sublevel, listeners are able to understand conventional narrative and descriptive texts, such as expanded descriptions of persons, places, and things, and narrations about past, present, and future events. The speech is predominantly in familiar target-language patterns. Listeners understand the main facts and many supporting details. Comprehension derives not only from situational and subject-matter knowledge, but also from an increasing overall facility with the language itself Advanced Low:

At the Advanced Low sublevel, listeners are able to understand short conventional narrative and descriptive texts with a clear underlying structure though their comprehension may be uneven. The listener understands the main facts and some supporting details. Comprehension may often derive primarily from situational and subject-matter knowledge.

ACTFL: Intermediate (Listening):

At the Intermediate level, listeners can understand information conveyed in simple, sentence-length speech on familiar or everyday topics. They are generally able to comprehend one utterance at a time while engaged in face-to-face conversations or in routine listening tasks such as understanding highly contextualized messages, straightforward announcements, or simple instructions and directions. Listeners rely heavily on redundancy, restatement, paraphrasing, and contextual clues.

Intermediate-level listeners understand speech that conveys basic information. This speech is simple, minimally connected, and contains high-frequency vocabulary.

Intermediate-level listeners are most accurate in their comprehension when getting meaning from simple, straightforward speech. They are able to comprehend messages found in highly familiar everyday contexts. Intermediate listeners require a controlled listening environment where they hear what they may expect to hear.

Intermediate High:

At the Intermediate High sublevel, listeners are able to understand, with ease and confidence, simple sentence-length speech in basic personal and social contexts. They can derive substantial meaning from some connected texts typically understood by Advanced-level listeners although there often will be gaps in understanding due to a limited knowledge of the vocabulary and structures of the spoken language.

Intermediate Mid:

At the Intermediate Mid sublevel, listeners are able to understand simple, sentence-length speech, one utterance at a time, in a variety of basic personal and social contexts. Comprehension is most often accurate with highly familiar and predictable topics although a few misunderstandings may occur. Intermediate Mid listeners may get some meaning from oral texts typically understood by Advanced-level listeners.

Intermediate Low:

At the Intermediate Low sublevel, listeners are able to understand some information from sentence-length speech, one utterance at a time, in basic personal and social contexts, though comprehension is often uneven. At the Intermediate Low sublevel, listeners show little or no comprehension of oral texts typically understood by Advanced-level listeners.

ACTFL: Distinguished (Reading):

At the Distinguished level, readers can understand a wide variety of texts from many genres including professional, technical, academic, and literary. These texts are characterized by one or more of the following: a high level of abstraction, precision or uniqueness of vocabulary; density of information; cultural reference; or complexity of structure. Readers are able to comprehend implicit and inferred information, tone, and point of view and can follow highly persuasive arguments. They are able to understand unpredictable turns of thought related to sophisticated topics.

Readers at the Distinguished level are able to understand writing tailored to specific audiences as well as a number of historical, regional, and colloquial variations of the language. These readers are able to appreciate the richness of written language. Distinguished-level readers understand and appreciate texts that use highly precise, low-frequency vocabulary as well as complex rhetorical structures to convey subtle or highly specialized information. Such texts are typically essay length but may be excerpts from more lengthy texts.

Distinguished-level readers comprehend language from within the cultural framework and are able to understand a writer's use of nuance and subtlety. However, they may still have difficulty fully understanding certain nonstandard varieties of the written language.

ACTFL: Novice (Listening):

At the Novice level, listeners can understand key words, true aural cognates, and formulaic expressions that are highly contextualized and highly predictable, such as those found in introductions and basic courtesies. Novice-level listeners understand words and phrases from simple questions, statements, and high-frequency commands. They typically require repetition, rephrasing, and/or a slowed rate of speech for comprehension. They rely heavily on extralinguistic support to derive meaning. Novice-level listeners are most accurate when they are able to recognize speech that they can anticipate. In this way, these listeners tend to recognize rather than truly comprehend. Their listening is largely dependent on factors other than the message itself.

Novice High:

At the Novice High sublevel, listeners are often but not always able to understand information from sentence-length speech, one utterance at a time, in basic personal and social contexts where there is contextual or extralinguistic support, though comprehension may often be very uneven. They are able to understand speech dealing with areas of practical need such as highly standardized messages, phrases, or instructions, if the vocabulary has been learned. Novice Mid:

At the Novice Mid sublevel, listeners can recognize and begin to understand a number of high-frequency, highly contextualized words and phrases including aural cognates and borrowed words. Typically, they understand little more than one phrase at a time, and repetition may be required. Novice Low:

At the Novice Low sublevel, listeners are able occasionally to recognize isolated words or very high-frequency phrases when those are strongly supported by context. These listeners show virtually no comprehension of any kind of spoken message, not even within the most basic personal and social contexts.

ACTFL: Distinguished (Reading):

At the Distinguished level, readers can understand a wide variety of texts from many genres including professional, technical, academic, and literary. These texts are characterized by one or more of the following: a high level of abstraction, precision or uniqueness of vocabulary; density of information; cultural reference; or complexity of structure. Readers are able to comprehend implicit and inferred information, tone, and point of view and can follow highly persuasive arguments. They are able to understand unpredictable turns of thought related to sophisticated topics.

Readers at the Distinguished level are able to understand writing tailored to specific audiences as well as a number of historical, regional, and colloquial variations of the language. These readers are able to appreciate the richness of written language. Distinguished-level readers understand and appreciate texts that use highly precise, low-frequency vocabulary as well as complex rhetorical structures to convey subtle or highly specialized information. Such texts are typically essay length but may be excerpts from more lengthy texts.

Distinguished-level readers comprehend language from within the cultural framework and are able to understand a writer's use of nuance and ACTFL: Superior (Reading):

At the Superior level, readers are able to understand texts from many genres dealing with a wide range of subjects, both familiar and unfamiliar. Comprehension is no longer limited to the reader's familiarity with subject matter, but also comes from a command of the language that is supported by a broad vocabulary, an understanding of complex structures and knowledge of the target culture. Readers at the Superior level can draw inferences from textual and extralinguistic clues.

Superior-level readers understand texts that use precise, often specialized vocabulary and complex grammatical structures. These texts feature argumentation, supported opinion, and hypothesis, and use abstract linguistic formulations as encountered in academic and professional reading. Such texts are typically reasoned and/or analytic and may frequently contain cultural references.

Superior-level readers are able to understand lengthy texts of a professional, academic, or literary nature. In addition, readers at the Superior level are generally aware of the aesthetic properties of language and of its literary styles, but may not fully understand texts in which cultural references and assumptions are deeply embedded.

ACTFL: Advanced (Reading):

At the Advanced level, readers can understand the main idea and supporting details of authentic narrative and descriptive texts. Readers are able to compensate for limitations in their lexical and structural knowledge by using contextual clues. Comprehension is likewise supported by knowledge of the conventions of the language (e.g., noun/adjective agreement, verb placement, etc.). When familiar with the subject matter, Advanced-level readers are also able to derive some meaning from straightforward argumentative texts (e.g., recognizing the main argument).

Advanced-level readers are able to understand texts that have a clear and predictable structure. For the most part, the prose is uncomplicated, and the subject matter pertains to real-world topics of general interest.

Advanced-level readers demonstrate an independence in their ability to read subject matter that is new to them. They have sufficient control of standard linguistic conventions to understand sequencing, time frames, and chronology. However, these readers are likely challenged by texts in which issues are treated abstractly.

Advanced High:

At the Advanced High sublevel, readers are able to understand, fully and with ease, conventional narrative and descriptive texts of any length as well as more complex factual material. They are able to follow some of the essential points of argumentative texts in areas of special interest or knowledge. In addition, they are able to understand parts of texts that deal with unfamiliar topics or situations. These readers are able to go beyond comprehension of the facts in a text, and to begin to recognize author-intended inferences. An emerging awareness of the aesthetic properties of language and of its literary styles permits comprehension of a wide variety of texts. Misunderstandings may occur when reading texts that are structurally and/or conceptually more complex.

Advanced Mid:

At the Advanced Mid sublevel, readers are able to understand conventional narrative and descriptive texts, such as expanded descriptions of persons, places, and things and narrations about past, present, and future events. These texts reflect the standard linguistic conventions of the written form of the language in such a way that readers can predict what they are going to read. Readers understand the main ideas, facts, and many supporting details. Comprehension derives not only from situational and subject-matter knowledge but also from knowledge of the language itself. Readers at this level may derive some meaning from texts that are structurally and/or conceptually more complex.

Advanced Low:

At the Advanced Low sublevel, readers are able to understand conventional narrative and descriptive texts with a clear underlying structure though their comprehension may be uneven. These texts predominantly contain high-frequency vocabulary and structures. Readers understand the main ideas and some supporting details. Comprehension may often derive primarily from situational and subject-matter knowledge. Readers at this level will be challenged to comprehend more complex texts.

ACTFL: Intermediate (Reading):

At the Intermediate level, readers can understand information conveyed in simple, predictable, loosely connected texts. Readers rely heavily on contextual clues. They can most easily understand information if the format of the text is familiar, such as in a weather report or a social announcement.

Intermediate-level readers are able to understand texts that convey basic information such as that found in announcements, notices, and online bulletin boards and forums. These texts are not complex and have a predictable pattern of presentation. The discourse is minimally connected and primarily organized in individual sentences and strings of sentences containing predominantly high-frequency vocabulary.

Intermediate-level readers are most accurate when getting meaning from simple, straightforward texts. They are able to understand messages found in highly familiar, everyday contexts. At this level, readers may not fully understand texts that are detailed or those texts in which knowledge of language structures is essential in order to understand sequencing, time frame, and chronology.

Intermediate High:

At the Intermediate High sublevel, readers are able to understand fully and with ease short, non-complex texts that convey basic information and deal with personal and social topics to which the reader brings personal interest or knowledge. These readers are also able to understand some connected texts featuring description and narration although there will be occasional gaps in understanding due to a limited knowledge of the vocabulary, structures, and writing conventions of the language.

Intermediate Mid:

At the Intermediate Mid sublevel, readers are able to understand short, non-complex texts that convey basic information and deal with basic personal and social topics to which the reader brings personal interest or knowledge, although some misunderstandings may occur. Readers at this level may get some meaning from short connected texts featuring description and narration, dealing with familiar topics.

Intermediate Low:

At the Intermediate Low sublevel, readers are able to understand some information from the simplest connected texts dealing with a limited number of personal and social needs, although there may be frequent misunderstandings. Readers at this level will be challenged to derive meaning from connected texts of any length.

ACTFL: Novice (Reading):

At the Novice level, readers can understand key words and cognates, as well as formulaic phrases that are highly contextualized. Novice-level readers are able to get a limited amount of information from highly predictable texts in which the topic or context is very familiar, such as a hotel bill, a credit card receipt, or a weather map. Readers at the Novice level may rely heavily on their own background knowledge and extralinguistic support (such as the imagery on the weather map or the format of a credit card bill) to derive meaning.

Readers at the Novice level are best able to understand a text when they are able to anticipate the information in the text. At the Novice level, recognition of key words, cognates, and formulaic phrases makes comprehension possible.

Novice High:

At the Novice High sublevel, readers can understand, fully and with relative ease, key words and cognates, as well as formulaic phrases across a range of highly contextualized texts. Where vocabulary has been learned, they can understand predictable language and messages such as those found on train schedules, roadmaps, and street signs. Readers at the Novice High sublevel are typically able to derive meaning from short, non-complex texts that convey basic information for which there is contextual or extralinguistic support.

Novice Mid:

At the Novice Mid sublevel, readers are able to recognize the letters or symbols of an alphabetic or syllabic writing system or a limited number of characters in a character-based language. They can identify a number of highly contextualized words and phrases including cognates and borrowed words but rarely understand material that exceeds a single phrase. Rereading is often required.

Novice Low:

At the Novice Low sublevel, readers are able to recognize a limited number of letters, symbols, or characters. They are occasionally able to identify high-frequency words and/or phrases when strongly supported by context.

In another example, the EF SET is a standardized objectively-scored test of listening and reading skills. It is designed to classify test takers' reading and listening performances on the test into one of the 6 levels established by the Common European Framework of Reference (CEFR), a set of common guidelines outlining the expected proficiencies of language learners at 6 distinct levels as indicated in the table below. In addition, EF SET PLUS test takers' combined reading and listening scores are classified by an internal EF scale from 1 to 100.

Categories and levels from EF SET include (see Table 1):

TABLE 1

Categories and levels from EF SET

| Type of Language User | Level | Code | Description |
|---|---|---|---|
| Basic | Beginner | A1 | Understands familiar everyday words, expressions and very basic phrases aimed at the satisfaction of needs of a concrete type |
| Basic | Elementary | A2 | Understands sentences and frequently used expressions (e.g. personal and family information, shopping, local geography, employment) |
| Independent | Intermediate | B1 | Understand the main points of clear, standard input on familiar matters regularly encountered in work, school, leisure, etc. |
| Independent | Upper intermediate | B2 | Understands the main ideas of complex text or speech on both concrete and abstract topics, including technical discussions in his/her field of specialization |
| Proficient | Advanced | C1 | Understands a wide range of demanding, longer texts, and recognizes implicit or nuanced meanings |
| Proficient | Proficient | C2 | Understands with ease virtually every form of material read, including abstract or linguistically complex text such as manuals, specialized articles and literary works, and any kind of spoken language, including live broadcasts delivered at native speed |

In another example of standard models, the Interagency Language Roundtable (ILR) scale is a set of descriptions of abilities to communicate in a language. It was originally developed by the United States Foreign Service Institute, and is still widely known as the FSI scale. It consists of descriptions of five levels of language proficiency.

ILR: "What is elementary proficiency? (S-1)":

Definition: Elementary proficiency is the first level of five in the Interagency Language Roundtable (ILR) scale of language proficiency, formerly called the Foreign Service Institute (FSI) scale. This level is sometimes referred to as S-1 or Level 1. A person at this level is described as follows:
  able to satisfy routine travel needs and minimum courtesy requirements;

can ask and answer questions on very familiar topics; within the scope of very limited language experience;

can understand simple questions and statements, allowing for slowed speech, repetition or paraphrase;

has a speaking vocabulary which is inadequate to express anything but the most elementary needs; makes frequent errors in pronunciation and grammar, but can be understood by a native speaker used to dealing with foreigners attempting to speak the language;

while topics which are "very familiar" and elementary needs vary considerably from individual to individual, any person at the S-1 level should be able to order a simple meal, ask for shelter or lodging, ask and give simple directions, make purchases, and tell time.

ILR: "What is limited working proficiency? (S-2)":

Definition Limited working proficiency is the second level of five in the Interagency Language Roundtable (ILR) scale of language proficiency, formerly called the Foreign Service Institute (FSI) scale. This level is sometimes referred to as S-2 or level 2. A person at this level is described as follows:

able to satisfy routine social demands and limited work requirements can handle with confidence, but not with facility, most social situations including introductions and casual conversations about current events, as well as work, family, and autobiographical information can handle limited work requirements, needing help in handling any complications or difficulties; can get the gist of most conversations on non-technical subjects (i.e. topics which require no specialized knowledge), and has a speaking vocabulary sufficient to respond simply with some circumlocutions has an accent which, though often quite faulty, is intelligible can usually handle elementary constructions quite accurately but does not have thorough or confident control of the grammar.

ILR: "What is professional working proficiency? (S-3)":

Definition: Professional working proficiency is the fourth level of five in the Interagency Language Roundtable (ILR) scale of language proficiency, formerly called the Foreign Service Institute (FSI) scale. This level is sometimes referred to as S-3 or Level 3. A person at this level is described as follows:

able to speak the language with sufficient structural accuracy and vocabulary to participate effectively in most formal and informal conversations on practical, social, and professional topics can discuss particular interests and special fields of competence with reasonable ease has comprehension which is quite complete for a normal rate of speech has a general vocabulary which is broad enough that he or she rarely has to grope for a word has an accent which may be obviously foreign; has a good control of grammar; and whose errors virtually never interfere with understanding and rarely disturb the native speaker.

ILR: "What is full professional proficiency? (S-4)":

Definition: Full professional proficiency is the fourth level of five in the Interagency Language Roundtable (ILR) scale of language proficiency, formerly called the Foreign Service Institute (FSI) scale. This level is sometimes referred to as S-4 or level 4. A person at this level is described as follows:

able to use the language fluently and accurately on all levels normally pertinent to professional needs;

can understand and participate in any conversations within the range of own personal and professional experience with a high degree of fluency and precision of vocabulary would rarely be taken for a native speaker, but can respond appropriately even in unfamiliar situations makes only quite rare and unpatterned errors of pronunciation and grammar can handle informal interpreting from and into the language.

IR: "What is native or bilingual proficiency? (S-5)":

Definition: Native or bilingual proficiency is the fifth level of five in the Interagency Language Roundtable (ILR) scale of language proficiency, formerly called the Foreign Service Institute (FSI) scale. This level is sometimes referred to as S-5 or level 5. A person at this level is described as follows:

has a speaking proficiency equivalent to that of an educated native speaker has complete fluency in the language, such that speech on all levels in fully accepted by educated native speakers in all of its features, including breadth of vocabulary and idiom, colloquialisms, and pertinent cultural references.

Each of the foregoing standards and methodologies are incorporated herein by reference for all that they teach.

SUMMARY

When a customer initiates a call with a contact center agent, a routing decision flow is executed to match the customer with an agent. The routing flow considers the choice of language or languages. Additionally, information may be obtained that serves as a cue as to a particular issue or subject matter and an agent skill that may be necessary, or at least helpful, to resolve the purpose of the call. However if the language proficiency skill level of the customer is not at the correct level when compared with the agent like in terms of vocabulary selection, fluency, pronunciation, grammar, and/or speed, then the call may lead to a negative customer experience or even a failure to successfully conclude the call. As disclosed herein, providing content from the agent that comprises the correct level of language proficiency can be determined to best match that of the customer and/or to conduct the call to successfully address the issue that motivated the call. Here, the correct level can be either at the same level or a desired range of the agent's linguistic skill relative to the customer (e.g., must be able to be 10-20% higher than customer, to project an air of authority and confidence).

Once a customer is routed and connected to an agent and a conversation starts, while communicating with the customer an agent typically starts using a vocabulary and grammar at a level that is comfortable. The agent often has a higher command over the language, especially for a particular domain (e.g., subject matter, topic, scope of business, etc.) related to the reason for the communication. The agent's use of vocabulary, fluency, accent, speed, etc. compared to customer, it may be at too high a level to effectively communicate with the customer. In other situations, such as in an attempt to be understood, the agent may simplify their use of language too much. In particular, the agent may oversimply their vocabulary or grammar, and thus appear to the customer as uneducated or unskilled in providing service.

Similarly, agents may get connected to customers having a higher vocabulary, fluency, good accent, speed, etc. If an agent is not able to upgrade or downgrade their language skills for a particular customer, conversation time, tying up computing, network, and agent resource. A mismatched language skills may result in a bad customer experience or a negative attitude toward the contact center, associated enterprise, and/or products or services of the enterprise.

In any of the above situations, the agent may or may not be aware of the mismatch, and thus not aware of the need to modify their vocabulary or the benefits to be gained (or harm avoided) by transferring the call to another agent better able to match the vocabulary of the customer. By providing cues to the agent to adjust their vocabulary or transfer the customer to a better matched agent, communications may be improved, and goodwill increased. Specific improvements may be provided with benefit from an artificial intelligence and/or machine learning algorithm trained from past conversations and their successes and the successes/failures that resulted from specific modifications to an agent's vocabulary and/or specific vocabulary substitutions from the agent's natural speech.

These and other needs are addressed by the various embodiments and configurations of the present invention. The present invention can provide a number of advantages depending on the particular configuration. These and other advantages will be apparent from the disclosure of the invention(s) contained herein.

In one embodiment, systems and methods are provided wherein estimates the language skill level (e.g., vocabulary, grammar, pacing, etc.) for the customer or for the agent can be determined and analyzed. In a further embodiment, once the agent and customer are in-call, the interaction therebetween may be analyzed to determine an optimal relationship between a customer's skill level and a 'targeted agent level'. In another embodiment, means to coach or prompt an agent to change their skill level (as presented to the customer) are provided. If the agent is unable to change their skill level, or if assessed to be not possible (or not being done by agent even if past history shows it could be possible for the agent), then the call may be escalated to another party, such as a supervisor or transfer to another agent based on the language mismatch. As a result, if a mismatch is determined to be present specific suggestions may be provided to allow the agent to upgrade/downgrade their language level to better deliver the targeted level for the interaction.

Language proficiency of the customer is determined and matched to an appropriate agent, alternatively, the matching is based on other criteria (e.g., subject matter expertise, authority, availability, etc.) and, based on the customer's proficiency the agent's proficiency is selected to comport with that of the customers. Inputs to the analysis may include, but are not limited to: a) Language rating of customer stored in historical record (e.g., customer resource management (CRM)), ratings by previous agent during prior calls with the customer, automated language analysis from previous live calls; b) Language rating as determined from real-time analysis of one or more calls/interactions from a call recording/work force optimization (WFO) platform; c) Estimated language skill derived from a chat interaction or from the text of an email that is leading up to a voice interaction; d) Language skill level estimated from customer's public postings on social media channels; and/or e) Language skill level estimated from interaction with a natural language voice bot (or chatbot) prior to routing/escalating to a voice agent.

After a customer's language proficiency skill level is rated with respect to one or more attributes, the rating(s) are used as selection criteria into a routing algorithm in order to match skills with an agent, or to select an agent with the ability to speak at a desired range of skill that may be greater than, similar, or simpler than the customer rating.

The possible range of language skill of an agent is rated a priori to call handling using attributes including, but not limited to: a) Language rating of agent as rated by previous customers in a survey, by supervisors, or by peer agents/workers; b) Rating by an automated language analyzer on current live call; c) Language rating from on-demand analysis of one or more calls/interactions from a call recording/WFO platform; d) Estimated language skill from a chat interaction or from the text of an email that is leading up to a voice interaction; e) Language skill level estimated from agent's public postings on social media channels; f) Language skill level estimated from interaction with a natural language voice bot (or chatbot) prior to routing/escalating to a voice agent; and/or g) Result of one or more standardized tests for vocabulary, grammar, etc.

In another embodiment, a hierarchy of first-preference for an agent, followed by next-best, etc. can be established as part of the routing process.

While the embodiments herein are generally directed toward spoken vocabulary, such as may be exchanged during an audio-only call or an audio-video call, it should be appreciated that other forms of communication comprising language and, therefore vocabulary selection, are also contemplated by the embodiments herein. More specifically, embodiments may include text-based communications (e.g., text messages (e.g., SMS, chat) and emails).

Exemplary aspects are directed to:

A system, comprising:
    a network interface to a network;
    a memory;
    a processor coupled to the memory programmed with executable instructions; and
    wherein the processor executing the executable instructions performs:
        receiving a communication comprising a customer communication device utilized by a customer and an automated resource holding the communication;
        accessing a customer language proficiency rating of the customer;
        accessing a pool of language proficiency ratings associated with each agent in a pool of agents;
        selecting an agent from the pool of agents that has an associated language proficiency rating that best matches the customer language proficiency rating; and
        connecting the communication to comprise an agent communication device associated with the selected agent.

A system, comprising:
    a network interface to a network;
    a memory;
    a processor coupled to the memory programmed with executable instructions; and
    wherein the processor executing the executable instructions performs:
        receiving a communication comprising customer content, from a customer utilizing a customer communication device, and agent content, from an agent utilizing an agent commination device;

accessing a customer language proficiency rating of the customer;

monitoring the agent content;

determining an agent language proficiency from the agent content;

determining whether the agent language proficiency is dissimilar from the customer language proficiency; and upon determining the dissimilarity is present, causing the agent communication device to present indicia of the dissimilarity.

A computer-implemented method of training a neural network for language proficiency comprising:

collecting a first set of words having a first language proficiency and a meaning;

modifying the set of words to a set of different words having the same meaning;

creating a first training set comprising the first set of words, the different set of words, and a set of words having a different meaning;

training the neural network in a first state using the first training set;

creating a second training set for a second stage of training comprising the first training set and the different set of words incorrectly identified as being synonyms with the first set of words; and training the neural network in a second stage using the second training set.

Any of the above aspects, wherein the processor executing the executable instructions performs accessing the customer language proficiency rating of the customer, further comprising:

Any of the above aspects, wherein determining the customer language proficiency rating of the customer, comprising:

accessing a scoring model having scored words;

prior to the communication, accessing a prior communication having content provided by the customer;

scoring the prior communication with the scoring model to determine a proficiency score of the communication; and making the proficiency score of the communication accessible as the customer language proficiency rating of the customer.

Any of the above aspects, wherein the prior communication comprises one or more of a social media posting, email, text message, voice message, voice call, transcription of a message, or transcription of a voice call.

Any of the above aspects, wherein the processor executing the executable instructions performs:

accessing the pool of language proficiency ratings associated with each agent in the pool of agents, comprising:

accessing a scoring model;

for each agent in the pool of agents:

prior to the communication, accessing a prior communication having content provided by ones of the agents in the pool of agents;

scoring a word within the prior communication against the scoring model;

determining an overall score; and making the overall score accessible as an entry in the pool of language proficiency ratings for each of the agents in the pool of agents.

Any of the above aspects, wherein at least one of the customer language proficiency rating or ones of the pool of language proficiency ratings associated with each agent in the pool of agents, comprises one or more of a vocabulary rating, technical sophistication rating, a fluency rating, a pronunciation rating, a grammar rating, or a speed rating.

Any of the above aspects, wherein selecting the agent from the pool of agents that has the associated language proficiency rating that best matches the customer language proficiency rating, further comprises the processor executing the executable instruction to perform:

accessing an acceptable range from the customer language proficiency rating; and selecting the agent from the pool of agents that has the associated language proficiency rating that is within the acceptable range.

Any of the above aspects, wherein the match is determined to be present when the agent from the pool of agents has the associated language proficiency equal to the customer language proficiency rating within a previously determined range.

Any of the above aspects, wherein selecting the agent from the pool of agents that has the associated language proficiency rating that best matches the customer language proficiency rating, further comprises the processor executing the executable instruction to perform:

accessing a desired variation from the customer language proficiency rating; and selecting the agent from the pool of agents that has the associated language proficiency rating having the desired variation from the customer language proficiency rating.

Any of the above aspects, wherein the processor executing the executable instructions performs accessing the customer language proficiency of the customer, comprising: determining the customer language proficiency of the customer, comprising:

accessing a scoring model;

prior to the communication, accessing a prior communication having content provided by the customer; and scoring the prior communication with the scoring model to produce the customer language proficiency score.

Any of the above aspects, wherein the prior communication comprises one or more of a social media posting, email, text message, voice message, voice call, transcription of a message, or transcription of a voice call.

Any of the above aspects, wherein the processor executing the executable instructions performs determining the agent language proficiency from the agent content, further comprising:

accessing a scoring model; and scoring the agent content with the scoring model to produce the agent language proficiency.

Any of the above aspects, wherein at least one of the customer language proficiency or the agent language proficiency, comprises one or more of a vocabulary rating, a technical sophistication rating, a fluency rating, a pronunciation rating, a grammar rating, or a speed rating.

Any of the above aspects, wherein determining whether the agent language proficiency is dissimilar from the customer language proficiency, comprises determining whether at last one word of the words provided by the agent as the portion of the communication has an agent language proficiency rating is outside acceptable range from.

Any of the above aspects, wherein the determining whether the agent language proficiency is dissimilar from the customer language proficiency, comprises determining an agent language proficiency scoring of the at least one word of the words provided by the agent as the portion of the communication being dissimilar from a customer language proficiency scoring of at least one word from at least one prior customer communication.

Any of the above aspects, further comprising:

determining, with the neural network after the second stage of training, whether at last one word of words provided by an agent as a portion of a communication with a customer has a language proficiency dissimilar from the customer language proficiency, wherein the customer language proficiency is determined by utilizing a prior communication of the customer as the source of the first set of words; and causing a real-time presentation of the dissimilarity on an agent communication device during the communication.

Any of the above aspects, further comprising, a real-time presentation of at least one alternative word selected from the second training set on the agent communication device.

Any of the above aspects, wherein the prior communication comprises one or more of a social media posting, email, text message, voice message, voice call, transcription of a message, or transcription of a voice call.

Any of the above aspects, wherein the first set of words having the language proficiency comprises at least one word having a language proficiency determined by a scoring model.

A system on a chip (SoC) including any one or more of the above aspects.

One or more means for performing any one or more of the above aspects.

Any one or more of the aspects as substantially described herein.

Any of the above aspects, wherein the data storage comprises a non-transitory storage device comprise at least one of: an on-chip memory within the processor, a register of the processor, an on-board memory co-located on a processing board with the processor, a memory accessible to the processor via a bus, a magnetic media, an optical media, a solid-state media, an input-output buffer, a memory of an input-output component in communication with the processor, a network communication buffer, and a networked component in communication with the processor via a network interface.

The phrases "at least one," "one or more," "or," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B, and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an embodiment that is entirely hardware, an embodiment that is entirely software (including firmware, resident software, micro-code, etc.) or an embodiment combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible, non-transitory medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including, but not limited to, wireless, wireline, optical fiber cable, RF, etc., or any suitable combination of the foregoing.

The terms "determine," "calculate," "compute," and variations thereof, as used herein, are used interchangeably and include any type of methodology, process, mathematical operation or technique.

The term "means" as used herein shall be given its broadest possible interpretation in accordance with 35 U.S.C., Section 112(f) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The preceding is a simplified summary of the invention to provide an understanding of some aspects of the invention. This summary is neither an extensive nor exhaustive overview of the invention and its various embodiments. It is intended neither to identify key or critical elements of the invention nor to delineate the scope of the invention but to present selected concepts of the invention in a simplified form as an introduction to the more detailed description presented below. As will be appreciated, other embodiments of the invention are possible utilizing, alone or in combination, one or more of the features set forth above or described in detail below. Also, while the disclosure is presented in terms of exemplary embodiments, it should be appreciated that an individual aspect of the disclosure can be separately claimed.

BRIEF DESCRIPTION OF THE DRAWINGS

The present disclosure is described in conjunction with the appended figures.

DETAILED DESCRIPTION

The ensuing description provides embodiments only and is not intended to limit the scope, applicability, or configuration of the claims. Rather, the ensuing description will provide those skilled in the art with an enabling description for implementing the embodiments. It will be understood that various changes may be made in the function and arrangement of elements without departing from the spirit and scope of the appended claims.

Any reference in the description comprising a numeric reference number, without an alphabetic sub-reference identifier when a sub-reference identifier exists in the figures, when used in the plural, is a reference to any two or more elements with a like reference number. When such a reference is made in the singular form, but without identification of the sub-reference identifier, is a reference one of the like numbered elements, but without limitation as to the particular one of the elements. Any explicit usage herein to the contrary or providing further qualification or identification shall take precedence.

The exemplary systems and methods of this disclosure will also be described in relation to analysis software, modules, and associated analysis hardware. However, to avoid unnecessarily obscuring the present disclosure, the following description omits well-known structures, components, and devices, which may be omitted from or shown in a simplified form in the figures or otherwise summarized.

For purposes of explanation, numerous details are set forth in order to provide a thorough understanding of the present disclosure. It should be appreciated, however, that the present disclosure may be practiced in a variety of ways beyond the specific details set forth herein.

Figure 1:
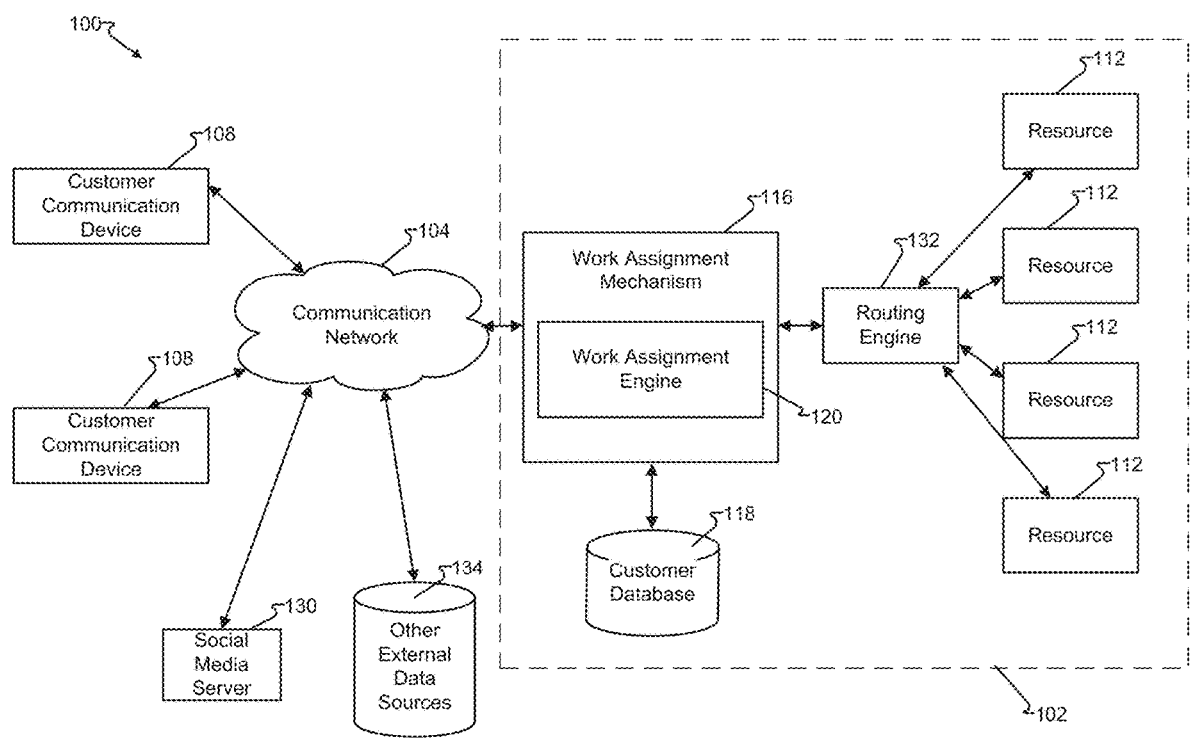
FIG. 1 depicts a first system in accordance with embodiments of the present disclosure.

With reference now to FIG. 1, communication system 100 is discussed in accordance with at least some embodiments of the present disclosure. The communication system 100 may be a distributed system and, in some embodiments, comprises a communication network 104 connecting one or more communication devices 108 to a work assignment mechanism 116, which may be owned and operated by an enterprise administering contact center 102 in which a plurality of resources 112 is distributed to handle incoming work items (in the form of contacts) from customer communication devices 108.

Contact center 102 is variously embodied to receive and/or send messages that are or are associated with work items and the processing and management (e.g., scheduling, assigning, routing, generating, accounting, receiving, monitoring, reviewing, etc.) of the work items by one or more resources 112. The work items are generally generated and/or received requests for a processing resource 112 embodied as, or a component of, an electronic and/or electromagnetically conveyed message. Contact center 102 may include more or fewer components than illustrated and/or provide more or fewer services than illustrated. The border indicating contact center 102 may be a physical boundary (e.g., a building, campus, etc.), legal boundary (e.g., company, enterprise, etc.), and/or logical boundary (e.g., resources 112 utilized to provide services to customers for a customer of contact center 102).

Furthermore, the border illustrating contact center 102 may be as-illustrated or, in other embodiments, include alterations and/or more and/or fewer components than illustrated. For example, in other embodiments, one or more of resources 112, customer database 118, and/or other component may connect to routing engine 132 via communication network 104, such as when such components connect via a public network (e.g., Internet). In another embodiment, communication network 104 may be a private utilization of, at least in part, a public network (e.g., VPN); a private network located, at least partially, within contact center 102; or a mixture of private and public networks that may be utilized to provide electronic communication of components described herein. Additionally, it should be appreciated that components illustrated as external, such as social media server 130 and/or other external data sources 134 may be within contact center 102 physically and/or logically, but still be considered external for other purposes. For example, contact center 102 may operate social media server 130 (e.g., a website operable to receive user messages from customers and/or resources 112) as one means to interact with customers via their customer communication device 108.

Customer communication devices 108 are embodied as external to contact center 102 as they are under the more direct control of their respective user or customer. However, embodiments may be provided whereby one or more customer communication devices 108 are physically and/or logically located within contact center 102 and are still considered external to contact center 102, such as when a customer utilizes customer communication device 108 at a kiosk and attaches to a private network of contact center 102 (e.g., WiFi connection to a kiosk, etc.), within or controlled by contact center 102.

It should be appreciated that the description of contact center 102 provides at least one embodiment whereby the following embodiments may be more readily understood without limiting such embodiments. Contact center 102 may be further altered, added to, and/or subtracted from without departing from the scope of any embodiment described herein and without limiting the scope of the embodiments or claims, except as expressly provided.

Additionally, contact center 102 may incorporate and/or utilize social media server 130 and/or other external data sources 134 may be utilized to provide one means for a resource 112 to receive and/or retrieve contacts and connect to a customer of a contact center 102. Other external data sources 134 may include data sources, such as service bureaus, third-party data providers (e.g., credit agencies, public and/or private records, etc.). Customers may utilize their respective customer communication device 108 to send/receive communications utilizing social media server 130.

In accordance with at least some embodiments of the present disclosure, the communication network 104 may comprise any type of known communication medium or collection of communication media and may use any type of protocols to transport electronic messages between endpoints. The communication network 104 may include wired and/or wireless communication technologies. The Internet is an example of the communication network 104 that constitutes an Internet Protocol (IP) network consisting of many computers, computing networks, and other communication devices located all over the world, which are connected through many telephone systems and other means. Other examples of the communication network 104 include, without limitation, a standard Plain Old Telephone System (POTS), an Integrated Services Digital Network (ISDN), the Public Switched Telephone Network (PSTN), a Local Area Network (LAN), a Wide Area Network (WAN), a Session Initiation Protocol (SIP) network, a Voice over IP (VoIP) network, a cellular network, and any other type of packet-switched or circuit-switched network known in the art. In addition, it can be appreciated that the communication network 104 need not be limited to any one network type and instead may be comprised of a number of different networks and/or network types. As one example, embodiments of the present disclosure may be utilized to increase the efficiency of a grid-based contact center 102. Examples of a grid-based contact center 102 are more fully described in U.S. Patent Publication No. 2010/0296417 to Steiner, the entire contents of which are hereby incorporated herein by reference. Moreover, the communication network 104 may comprise a number of different communication media, such as coaxial cable, copper cable/wire, fiber-optic cable, antennas for transmitting/receiving wireless messages, and combinations thereof.

The communication devices 108 may correspond to customer communication devices. In accordance with at least some embodiments of the present disclosure, a customer may utilize their communication device 108 to initiate a work item. Illustrative work items include, but are not limited to, a contact directed toward and received at a contact center 102, a web page request directed toward and received at a server farm (e.g., collection of servers), a media request, an application request (e.g., a request for application resources location on a remote application server, such as a SIP application server), and the like. The work item may be in the form of a message or collection of messages transmitted over the communication network 104. For example, the work item may be transmitted as a telephone call, a packet or collection of packets (e.g., IP packets transmitted over an IP network), an email message, an Instant Message, an SMS message, a fax, and combinations thereof. In some embodiments, the communication may not necessarily be directed at the work assignment mechanism 116, but rather may be on some other server in the communication network 104 where it is harvested by the work assignment mechanism 116, which generates a work item for the harvested communication, such as social media server 130. An example of such a harvested communication includes a social media communication that is harvested by the work assignment mechanism 116 from a social media server 130 or network of servers. Exemplary architectures for harvesting social media communications and generating work items based thereon are described in U.S. patent application Ser. Nos. 12/784,369, 12/706,942, and 12/707,277, filed Mar. 20, 2010, Feb. 17, 2010, and Feb. 17, 2010, respectively; each of which is hereby incorporated herein by reference in its entirety.

The format of the work item may depend upon the capabilities of the communication device 108 and the format of the communication. In particular, work items are logical representations within a contact center 102 of work to be performed in connection with servicing a communication received at contact center 102 (and, more specifically, the work assignment mechanism 116). The communication may be received and maintained at the work assignment mechanism 116, a switch or server connected to the work assignment mechanism 116, or the like, until a resource 112 is assigned to the work item representing that communication. At which point, the work assignment mechanism 116 passes the work item to a routing engine 132 to connect the communication device 108, which initiated the communication, with the assigned resource 112.

Although the routing engine 132 is depicted as being separate from the work assignment mechanism 116, the routing engine 132 may be incorporated into the work assignment mechanism 116 or its functionality may be executed by the work assignment engine 120.

In accordance with at least some embodiments of the present disclosure, the communication devices 108 may comprise any type of known communication equipment or collection of communication equipment. Examples of a suitable communication device 108 include, but are not limited to, a personal computer, laptop, Personal Digital Assistant (PDA), cellular phone, smart phone, telephone, or combinations thereof. In general, each communication device 108 may be adapted to support video, audio, text, and/or data communications with other communication devices 108 as well as the processing resources 112. The type of medium used by the communication device 108 to communicate with other communication devices 108 or processing resources 112 may depend upon the communication applications available on the communication device 108.

In accordance with at least some embodiments of the present disclosure, the work item is sent toward a collection of processing resources 112 via the combined efforts of the work assignment mechanism 116 and routing engine 132. The resources 112 can either be completely automated resources (e.g., Interactive Voice Response (IVR) units, microprocessors, servers, or the like), human resources utilizing communication devices (e.g., human agents utilizing a computer, telephone, laptop, etc.), or any other resource known to be used in contact center 102.

As discussed above, the work assignment mechanism 116 and resources 112 may be owned and operated by a common entity in a contact center 102 format. In some embodiments, the work assignment mechanism 116 may be administered by multiple enterprises, each of which has its own dedicated resources 112 connected to the work assignment mechanism 116.

In some embodiments, the work assignment mechanism 116 comprises a work assignment engine 120, which enables the work assignment mechanism 116 to make intelligent routing decisions for work items. In some embodiments, the work assignment engine 120 is configured to administer and make work assignment decisions in a queueless contact center 102, as is described in U.S. patent application Ser. No. 12/882,950, the entire contents of which are hereby incorporated herein by reference. In other embodiments, the work assignment engine 120 may be configured to execute work assignment decisions in a traditional queue-based (or skill-based) contact center 102.

The work assignment engine 120 and its various components may reside in the work assignment mechanism 116 or in a number of different servers or processing devices. In some embodiments, cloud-based computing architectures can be employed whereby one or more hardware components of the work assignment mechanism 116 are made available in a cloud or network such that they can be shared resources among a plurality of different users. Work assignment mechanism 116 may access customer database 118, such as to retrieve records, profiles, purchase history, previous work items, and/or other aspects of a customer known to contact center 102. Customer database 118 may be updated in response to a work item and/or input from resource 112 processing the work item.

It should be appreciated that one or more components of contact center 102 may be implemented in a cloud-based architecture in their entirety, or components thereof (e.g., hybrid), in addition to embodiments being entirely on-premises. In one embodiment, customer communication device 108 is connected to one of resources 112 via components entirely hosted by a cloud-based service provider, wherein processing and data storage hardware components may be dedicated to the operator of contact center 102 or shared or distributed amongst a plurality of service provider customers, one being contact center 102.

In one embodiment, a message is generated by customer communication device 108 and received, via communication network 104, at work assignment mechanism 116. The message received by a contact center 102, such as at the work assignment mechanism 116, is generally, and herein, referred to as a "contact." Routing engine 132 routes the contact to at least one of resources 112 for processing.

Figure 2:
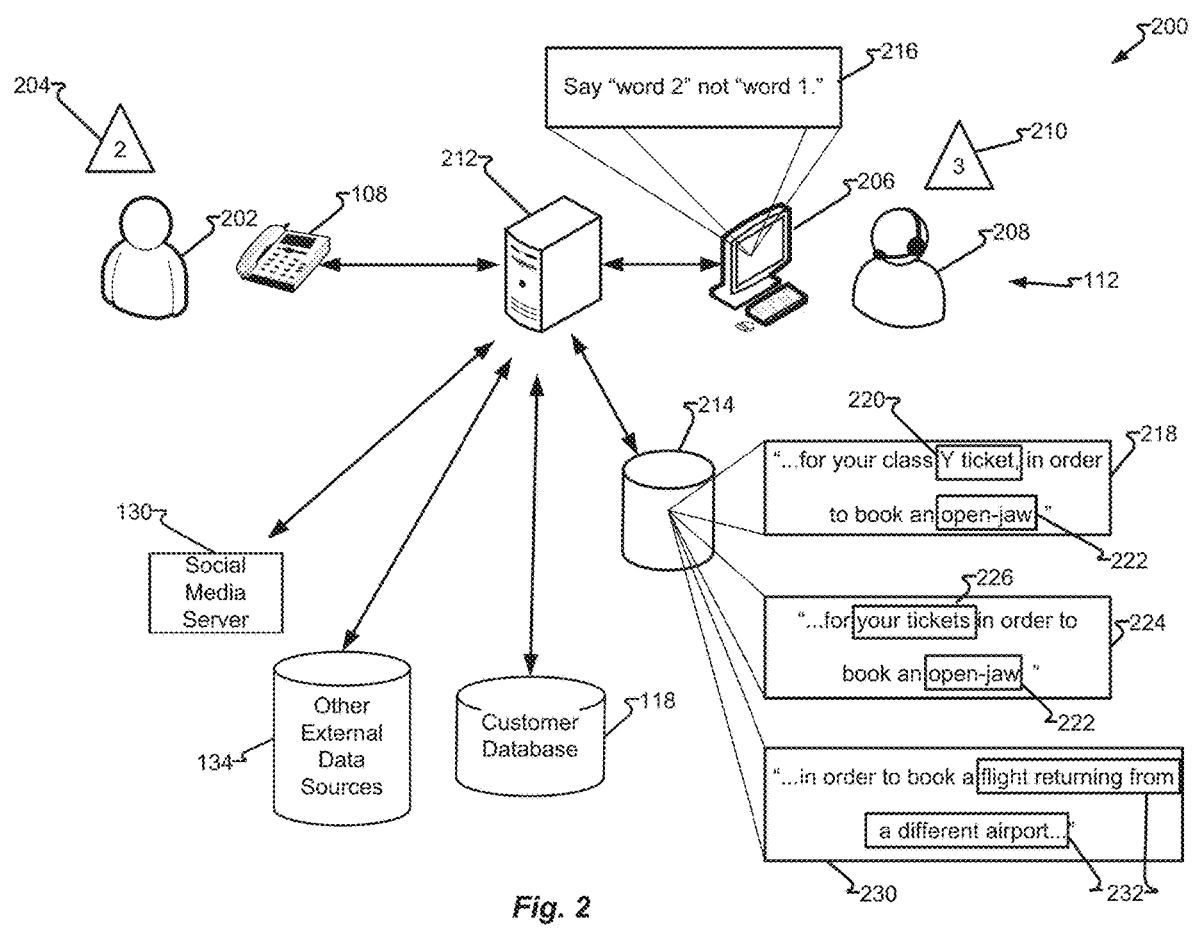
FIG. 2 depicts a second system in accordance with embodiments of the present disclosure.

FIG. 2 depicts system 200 in accordance with embodiments of the present disclosure. System 200 illustrates portions of system 100. However, for the sake of avoiding unnecessarily complicating the figure and description of the figure, portions of system 100 have been omitted. System 200 illustrates a communication occurring between customer 202 and agent 208, via client communication device 108 and agent communication device 206, respectively. The communication is monitored, and optionally managed by server 212. Server 212 may be, be co-integrated with, or integrate one or more of work assignment mechanism 116, work assignment engine 120, and/or routing engine 132 (see FIG. 1). Server 212 comprises (or accesses) a network interface to receive the communication and/or access other networked components. Accordingly, server 212 is a node on network 104 (see FIG. 1).

Agent 208 and agent communication device 206 illustrate one resource 112, when embodied as a human agent utilizing a communication device (agent communication device 206) to communicate via network 104 (see FIG. 1). Server 212 may comprise one or more processors or utilize processing components having processors (e.g., blade, server, etc.). Server 212 may be embodied as a virtual machine or distributed computing platform (e.g., array, grid, "cloud", etc.) wherein the network appearance of server 212 may be virtualized by the underlying hardware (e.g., computing devices, networking devices, data storage devices, etc.) that may be aggregated with other hardware or separated across a plurality of underlying hardware components. Server 212 and associated processors thereof are configured with machine-readable instructions maintained in a non-transitory storage device, such as a memory, to cause the processor(s) to perform operations described herein.

As illustrated in system 200, customer 202 is engaged in a communication with agent 208, the communication being monitored by server 212. More specifically, the communication content provided by agent 208 and optionally customer 202 is monitored. Here, the communication content comprises the vocalized inputs provided by agent 208 and/or customer 202, including but not limited to, words, word combinations, pitch, pace of speaking, other utterances, etc. that are captured by a microphone of agent communication device 206, encoded for transmission, sent to the receiving device (client communication device 108), decoded, and presented as sound by client communication device 108. Optionally the reverse, wherein sound is provided by customer 202 and similarly encoded, transmitted, received, decoded, and presented as sound for agent 208 may be provided.

While the embodiments herein are generally directed to audio-based commination, speech in particular, with a human agent (agent 208) in other embodiments, the communication may comprise textual communications (e.g., text chat, short message service (SMS), multimedia messaging service (MMS), rich communication services (RCS), email, etc.), audio and video communications, and/or communication with an automated agent (resource 112 when embodied as a computer-based agent). For example, a computer based agent may utilize a prepared script to present to customer 202 but select or adjust the script to present different communication content determined by the language proficiency of customer 202, wherein the different content comprises the same meaning as the original script but differs in terms of presented language proficiency.

In another embodiment, presenting communication content to customer 202 is more effective (e.g., readily understood, decreased misunderstandings, etc.) when presented at a language proficiency level of customer 202. Optionally, a variation may be determined to be more effective, such as within a previously determined range higher or lower, or within a previously determined range in one particular direction (e.g., only higher or only lower), such as to convey authority or solicit empathy.

Determining a language proficiency for customer 202 is variously embodied. If customer 202 is known, such as, by being associated with a telephone number reported by CallerID of a known customer maintained in customer database 118, providing an identity (e.g., providing a name, account number, etc., to an automated agent prior to being connected to agent 208), the identifying information may be utilized to access other repositories of prior communications of customer 202. For example, server 212 may access social media server 130 to obtain text postings, recorded speech, or other communication from customer 202. Speech may be transcribed into text prior to analysis. The content is then analyzed, such as with a proprietary and/or standard model for language proficiency (e.g., ACTFL, EF SET, ILR, etc.).

Similarly, other external data sources 134 may comprise other communication content of customer 202. Additionally or alternatively, customer database 118 may comprise communications or, a previously determined language proficiency score for customer 202. Server 212 may combine all of the communications obtained from all sources into an analysis or apply any necessary weighting or modification. For example, if it is determined that a particular social media server 130 maintains communications from users that underweight the user's speaking proficiency, then necessary modifications may be provided to convert the textual content from social media server 130 into a high spoken language proficiency.

Customer linguistic proficiency 204 is determined from one or more of the sources of prior communication content. Customer linguistic proficiency 204 may be an overall score or related to a particular communication type (e.g., speaking, listening, etc.). Accordingly, customer linguistic proficiency 204 may be a single value or an array of values for each of a number of communication types. Similarly, agent linguistic proficiency 210 is determined for agent 208 from explicit testing and/or by observing prior communications of agent 208, which may also be evaluated with a proprietary and/or standard proficiency model.

During the communication between customer 202 and agent 208, server 212 may determine that the communication content provided by agent 208 has a language proficiency that is sufficiently different from a desired language proficiency for the communication content provided to customer 202. In one embodiment, prompt 216 may provide an indicia of the difference, such as to prompt agent 208 to stop saying a particular word or word combination and/or to utilize a different word or word combination. The content of prompt 216 may be selected to cause the agent's language proficiency, as presented to customer 202, to be closer to the intended language proficiency that is desired to be presented to customer 202. Prompt 216 may be presented by agent communication device 206 as a visual prompt (e.g., screen pop) and/or audio prompt (e.g., "whisper" mode communication presented only to agent 208).

Data storage 214 may maintain data record for access by server 212. For example, communication portion 218, communication portion 224, communication portion 230 comprise communication portions where a word or word combination has been identified as affecting a language proficiency score for the associated communication portion. For example, term with a first language proficiency score 220 and term with a first language proficiency score 222 may be utilized to provide communication portion 218 with a first language proficiency score. If server 212 determines that a different language proficiency score is determined to be more appropriate, then a different word or word combinations may be selected. Accordingly, communication portion 224 may be selected having term with a second language proficiency score 226. As can be appreciated, the substitution of a word or word combination may be sufficient to provide the desired language proficiency. However, different phrasing, such as term with a third language proficiency score 232 may be utilized to provide the different language proficiency.

While data storage 214 illustrates communication portions having different language proficiencies determined by words or word combinations therein and provide variations in a vocabulary rating for such words or word combinations, in other embodiments, other factors may be determined and altered to affect a language proficiency score for a communication or portion of a communication provided by agent 208. In one embodiment, the agents speaking speed may be too high or too low and result in misaligned language proficiency with customer 202. Accordingly, server 212 may cause prompt 216 to prompt agent 208 to adjust their speaking speed to present the content of the communication with the desired language proficiency. In another embodiment, fluency may be determined, such as by stops-and-starts, pauses, non-word utterances (e.g., "um," "uh huh," etc.), filler words (e.g., "you know," etc.). In another embodiment, correct (or variations thereof) pronunciation of words is utilized. In yet another embodiment, correct (or variations thereof) grammar is utilized. In still another embodiment, technical sophistication may be utilized. For example, a router may be described as having, "a flashing light over the letters P-O-E," versus, "the LED for power-over-ethernet is flashing." In yet other embodiments, language proficiency may be determined by appropriate and/or accurate use of variations, such as by idioms, colloquialisms, or slang when such use avoids over-explaining understood terms or concepts (e.g., "let me know when 'the box' has restarted.").

In addition or alternative to the prompting of agent 208 to alter their communications to comport to a desired language proficiency, other actions may be taken. For example, a supervisor's communication device may be automatically connected to the communication, such that a supervisor may provide direct communication only to agent 208 (i.e., "whisper" mode) or to both agent 208 and customer 202. As a further option, a different agent may be selected to continue the communication and automatically connected to client communication device 108 to communicate with customer 202 and, optionally, disconnect agent communication device 206.

Figure 3:
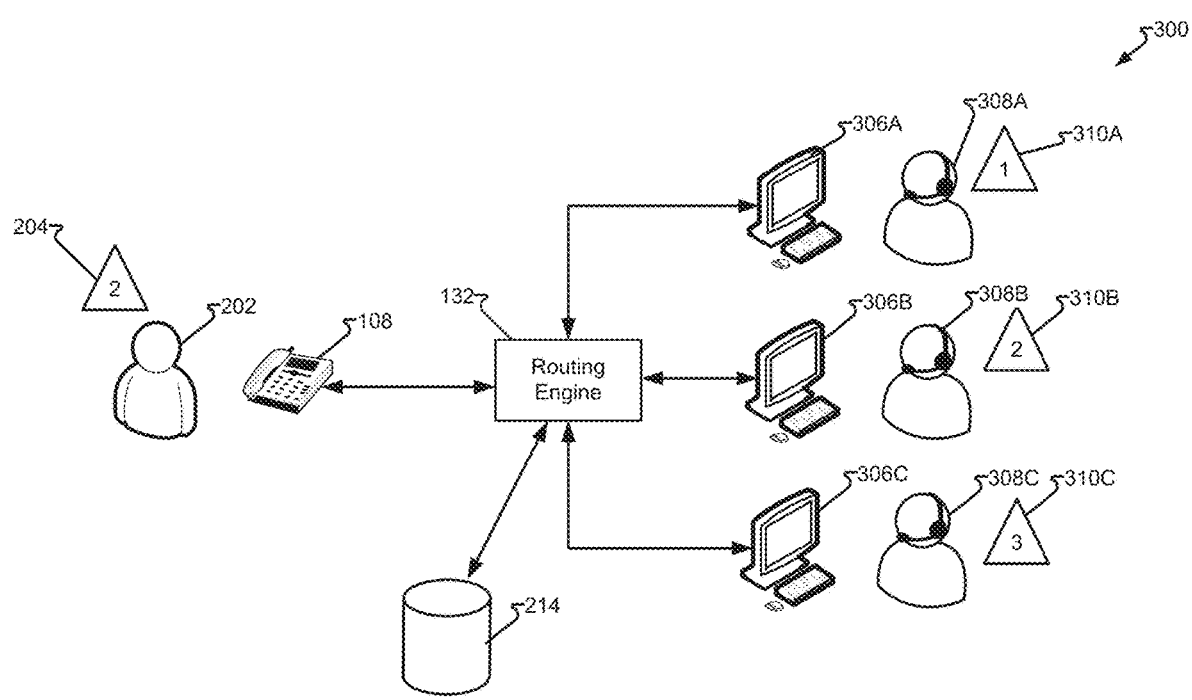
FIG. 3 depicts a third system in accordance with embodiments of the present disclosure.

FIG. 3 depicts system 300 in accordance with embodiments of the present disclosure. In one embodiment, customer linguistic proficiency 204, having customer linguistic proficiency 204, about to engage in a communication with one of agents 308A-C, via client communication device 108 and the respective one of agent communication device 306A-C. The communication may be initiated by customer linguistic proficiency 204 (i.e., "inbound") or initiated by a component of contact center 102 (i.e., "outbound").

A processor, such as a portion of or providing routing engine 132 executes machine-readable instructions to perform a routing decision. Aspects of customer linguistic proficiency 204 and/or one or more for agent 308A-C that are critical to the communication (e.g., sufficient fluency in a common language) have previously been determined and resolved. Matching customer 202 with a particular one of agent 308A-C now hinges on the associated agent language proficiency 310A-C, which may be a score, ranking, or other indicia of a single value (e.g., one language proficiency value) or a structure with multiple values (e.g., a value for reading language proficiency, a value for speaking language proficiency, etc.).

Routing engine 132 may access data storage 214 as one data source of language proficiency data for agent 308A-C and/or customer 202. Upon determining a best match between customer linguistic proficiency 204 and one of agent language proficiency 310A-C, such as agent language proficiency 310B, client communication device 108 is automatically connected to agent communication device 306B to enable a communication between customer 202 and agent 308B. The connection may be immediate or enqueued, such as to wait until agent communication device 306B becomes available.

Figure 4:
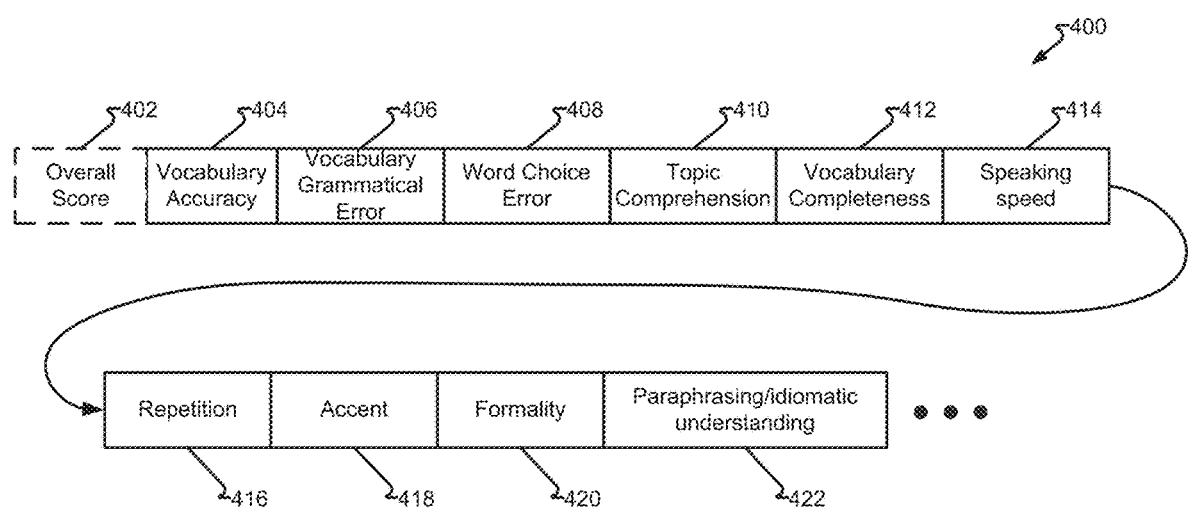
FIG. 4 depicts a data structure in accordance with embodiments of the present disclosure.

FIG. 4 depicts data structure 400 in accordance with embodiments of the present disclosure. In one embodiment, data storage 214 and/or other data storage (e.g., customer database 118) maintains all or a portion of data structure 400. Data structure 400 may be populated with entries, such as by the processes described herein, wherein values associated with general and/or specific language proficiencies may be maintained for customers (e.g., customer 202) and/or agents (e.g., agent 208, agent 308A-C). Accordingly, data structure 400, or one or more fields therein, may be accessed and utilized to make a routing decision (e.g., selecting a specific agent from agent 308A-C) and/or monitoring a communication for compliance with the customer's language proficiency (e.g., customer linguistic proficiency 204) or a target language proficiency to be presented to a customer (e.g., customer 202). If monitoring reveals a differences, or a difference beyond a previously determined value, corrective actions may be implemented.

In one embodiment, field 402 maintains an overall language proficiency score. In another embodiments, language proficiency scores are provided for a plurality of language attributes. For example, vocabulary accuracy 404 maintains values associated with the precision a particular term is used accurately to describe something (e.g., "the connector" versus "the RJ45") use of a vocabulary; vocabulary grammatical errors 406 maintain the frequency, pattern, and/or degree for which vocabulary errors are present in a communication; word choice error 408 maintains frequency, pattern, and/or degree for which the wrong word was used; topic comprehension 410 maintains a level of understanding for a particular topic of a communication and/or domain; vocabulary completeness 412 maintains the accuracy for which a corpus of words are held for a particular topic; speaking speed 414 maintains a pace of speech; repetition 416 maintains the frequency, pattern, and/or degree to which words are repeated and/or need to be repeated for an individual; accent 418 maintains the presence or degree to which an individual speaks with an accent or degree to which the accent affects effective communications; formality 420 maintains indicial of the formal/informal nature of prior communications; paraphrasing/idiomatic understanding 422 maintains the degree to which an individual is able to accurately use and/or understand the use of paraphrasing, idioms, or colloquialisms. It should be appreciated that more, fewer, and/or alternate metrics may be utilized. Additionally or alternatively, two or more fields of data structure 400 may be combined and/or any one or more fields separated into substructures having multiple values.

Figure 5:
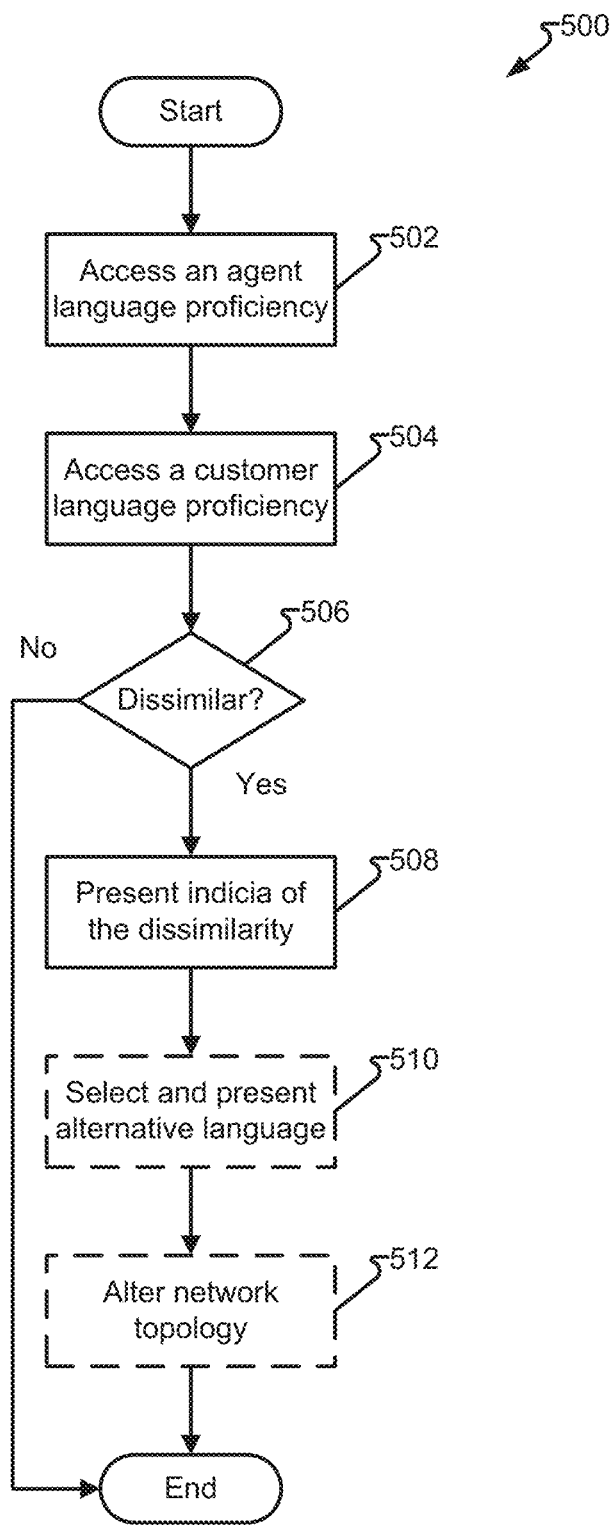
FIG. 5 depicts a first process in accordance with embodiments of the present disclosure.

FIG. 5 depicts process 500 in accordance with embodiments of the present disclosure. Process 500 may be embodied as machine-executable instructions maintained in a non-transitory data storage for execution by one or more processors, such as a processor of server 212, routing engine 132, work assignment mechanism 116, work assignment engine 120, or other processing component, or combination thereof.

In one embodiment, process 500 may be implemented to monitor a communication between customer 202, via client communication device 108, and agent 208, via agent communication device 206, communicating over network 104. Step 502 accesses an agent linguistic proficiency 210 for the ongoing communication. Step 504 accesses a customer's linguistic proficiency 204. The customer's linguistic proficiency 204 may be determined from the ongoing communication and/or from one or more prior communications, such as may be maintained in social media server 130, other external data sources 134, customer database 118, etc. as content of a communication or as maintained as a data record or field, such as a field of data structure 400.

Next, test 506 determines if there is a dissimilarity between the agent's linguistic proficiency 210 and the customer's linguistic proficiency 204. Additionally or alternatively, test 506 determines if there is a difference between the agent's linguistic proficiency 210, as presented to the customer 202, and the customer's linguistic proficiency 204. If test 506 is determined in the negative, process 500 may end or loop repeat until such time as the communication as ended.

If test 506 is determined in the affirmative, step 508 presents indicia of the dissimilarity, Optionally, step 510 may incorporate a more specific prompt for actions to discontinue (or decrease frequency) and/or actions to initiate (or increase frequency), such as by prompt 216 (see FIG. 2) providing words to use more of and/or less of in order to alter the agent's linguistic proficiency 210 as presented to customer 202, such as alternatives maintained in data storage 214. As a further option, step 512 may alter the network topology including, adding a supervisor's communication device to communicate solely to agent 208, adding a supervisor's communication device to communicate with agent 208 and customer 202, adding another agent to the communication, adding another agent and removing the current agent 208 from the communication—via network connectivity to their respective communication devices.

Figure 6:
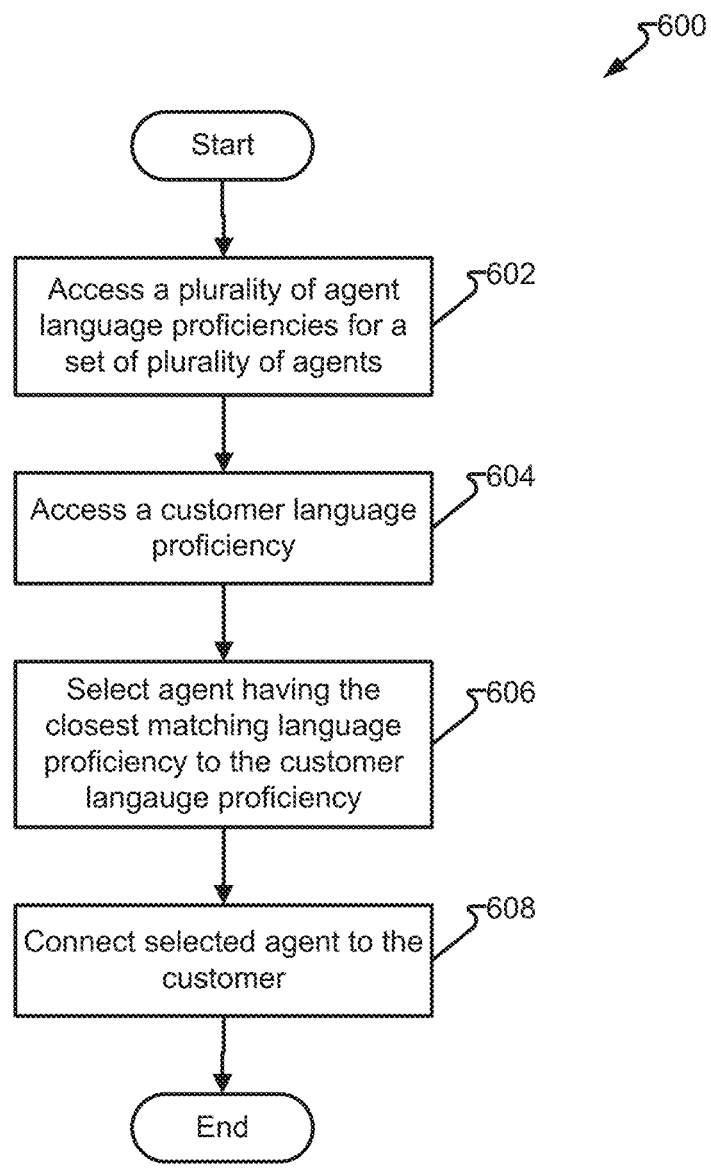
FIG. 6 depicts a second process in accordance with embodiments of the present disclosure.

FIG. 6 depicts process 600 in accordance with embodiments of the present disclosure. Process 600 may be embodied as machine-executable instructions maintained in a non-transitory data storage for execution by one or more processors, such as a processor of server 212, routing engine 132, work assignment mechanism 116, work assignment engine 120, or other processing component, or combination thereof.

In one embodiment, process 600 may be utilized to select a particular one of agents 308A-C to engage in a communication with customer 202. Step 602 accesses agent language proficiency 310A-C for associated agents 308A-C. Step 604 accesses customer linguistic proficiency 204 for an associated customer 202. Step 606 selects one of agent 308 to conduct the communication with customer 202. Step 608 then connects the selected one of agent 308 to the customer via connecting client communication device 108 to the particular agent communication device 306 associated with the selected agent.

Figure 7:
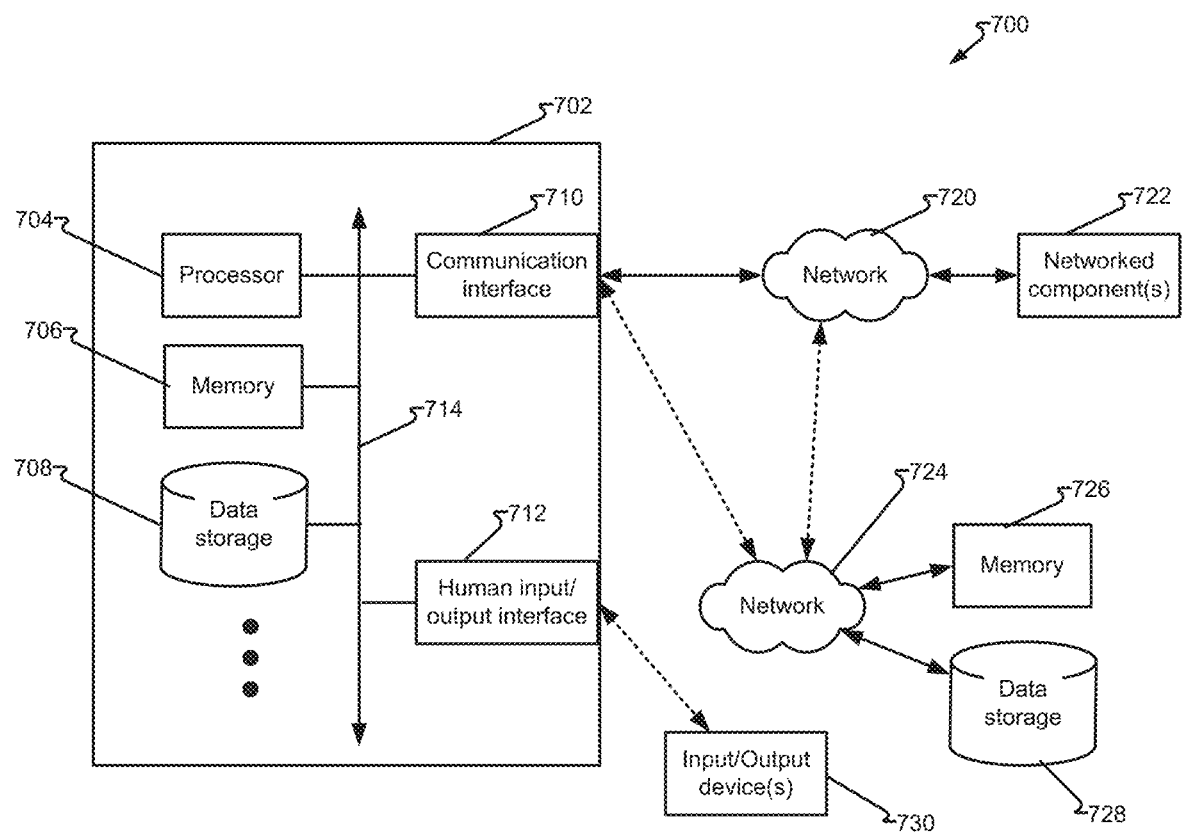
FIG. 7 depicts a fourth system in accordance with embodiments of the present disclosure.

FIG. 7 depicts device 702 in system 700 in accordance with embodiments of the present disclosure. In one embodiment, server 212, agent communication device 206, and/or agent communication device 306 may be embodied, in whole or in part, as device 702 comprising various components and connections to other components and/or systems. The components are variously embodied and may comprise processor 704. Processor 704 may be embodied as a single electronic microprocessor or multiprocessor device (e.g., multicore) having therein components such as control unit(s), input/output unit(s), arithmetic logic unit(s), register(s), primary memory, and/or other components that access information (e.g., data, instructions, etc.), such as received via bus 714, executes instructions, and outputs data, again such as via bus 714. In other embodiments, processor 704 may comprise a shared processing device that may be utilized by other processes and/or process owners, such as in a processing array or distributed processing system (e.g., "cloud", farm, etc.). It should be appreciated that processor 704 is a non-transitory computing device (e.g., electronic machine comprising circuitry and connections to communicate with other components and devices). Processor 704 may operate a virtual processor, such as to process machine instructions not native to the processor (e.g., translate the Intel® 9xx chipset code to emulate a different processor's chipset or a non-native operating system, such as a VAX operating system on a Mac), however, such virtual processors are applications executed by the underlying processor (e.g., processor 704) and the hardware and other circuitry thereof.

In addition to the components of processor 704, device 702 may utilize memory 706 and/or data storage 708 for the storage of accessible data, such as instructions, values, etc. Communication interface 710 facilitates communication with components, such as processor 704 via bus 714 with components not accessible via bus 714. Communication interface 710 may be embodied as a network port, card, cable, or other configured hardware device. Additionally or alternatively, human input/output interface 712 connects to one or more interface components to receive and/or present information (e.g., instructions, data, values, etc.) to and/or from a human and/or electronic device. Examples of input/output devices 730 that may be connected to input/output interface include, but are not limited to, keyboard, mouse, trackball, printers, displays, sensor, switch, relay, etc. In another embodiment, communication interface 710 may comprise, or be comprised by, human input/output interface 712. Communication interface 710 may be configured to communicate directly with a networked component or utilize one or more networks, such as network 720 and/or network 724.

Communication network 104 may be embodied, in whole or in part, as network 720. Network 720 may be a wired network (e.g., Ethernet), wireless (e.g., WiFi, Bluetooth, cellular, etc.) network, or combination thereof and enable device 702 to communicate with network component(s) 722. In other embodiments, network 720 may be embodied, in whole or in part, as a telephony network (e.g., public switched telephone network (PSTN), private branch exchange (PBX), cellular telephony network, etc.)

Additionally or alternatively, one or more other networks may be utilized. For example, network 724 may represent a second network, which may facilitate communication with components utilized by device 702. For example, network 724 may be an internal network to a business entity or other organization, such as contact center 102, whereby components are trusted (or at least more so) that networked components 722, which may be connected to network 720 comprising a public network (e.g., Internet) that may not be as trusted.

Components attached to network 724 may include memory 726, data storage 728, input/output device(s) 730, and/or other components that may be accessible to processor 704. For example, memory 726 and/or data storage 728 may supplement or supplant memory 706 and/or data storage 708 entirely or for a particular task or purpose. For example, memory 726 and/or data storage 728 may be an external data repository (e.g., server farm, array, "cloud," etc.) and allow device 702, and/or other devices, to access data thereon. Similarly, input/output device(s) 730 may be accessed by processor 704 via human input/output interface 712 and/or via communication interface 710 either directly, via network 724, via network 720 alone (not shown), or via networks 724 and 720. Each of memory 706, data storage 708, memory 726, data storage 728 comprise a non-transitory data storage comprising a data storage device.

It should be appreciated that computer readable data may be sent, received, stored, processed, and presented by a variety of components. It should also be appreciated that components illustrated may control other components, whether illustrated herein or otherwise. For example, one input/output device 730 may be a router, switch, port, or other communication component such that a particular output of processor 704 enables (or disables) input/output device 730, which may be associated with network 720 and/or network 724, to allow (or disallow) communications between two or more nodes on network 720 and/or network 724. For example, a connection between one particular customer, using a particular customer communication device 108, may be enabled (or disabled) with a particular networked component 722 and/or particular resource 112. Similarly, one particular networked component 722 and/or resource 112 may be enabled (or disabled) from communicating with a particular other networked component 722 and/or resource 112, including, in certain embodiments, device 702 or vice versa. Ones of ordinary skill in the art will appreciate that other communication equipment may be utilized, in addition or as an alternative, to those described herein without departing from the scope of the embodiments.

In the foregoing description, for the purposes of illustration, methods were described in a particular order. It should be appreciated that in alternate embodiments, the methods may be performed in a different order than that described without departing from the scope of the embodiments. It should also be appreciated that the methods described above may be performed as algorithms executed by hardware components (e.g., circuitry) purpose-built to carry out one or more algorithms or portions thereof described herein. In another embodiment, the hardware component may comprise a general-purpose microprocessor (e.g., CPU, GPU) that is first converted to a special-purpose microprocessor. The special-purpose microprocessor then having had loaded therein encoded signals causing the, now special-purpose, microprocessor to maintain machine-readable instructions to enable the microprocessor to read and execute the machine-readable set of instructions derived from the algorithms and/or other instructions described herein. The machine-readable instructions utilized to execute the algorithm(s), or portions thereof, are not unlimited but utilize a finite set of instructions known to the microprocessor. The machine-readable instructions may be encoded in the microprocessor as signals or values in signal-producing components and included, in one or more embodiments, voltages in memory circuits, configuration of switching circuits, and/or by selective use of particular logic gate circuits. Additionally or alternative, the machine-readable instructions may be accessible to the microprocessor and encoded in a media or device as magnetic fields, voltage values, charge values, reflective/non-reflective portions, and/or physical indicia.

In another embodiment, the microprocessor further comprises one or more of a single microprocessor, a multi-core processor, a plurality of microprocessors, a distributed processing system (e.g., array(s), blade(s), server farm(s), "cloud", multi-purpose processor array(s), cluster(s), etc.) and/or may be co-located with a microprocessor performing other processing operations. Any one or more microprocessor may be integrated into a single processing appliance (e.g., computer, server, blade, etc.) or located entirely or in part in a discrete component connected via a communications link (e.g., bus, network, backplane, etc. or a plurality thereof).

Examples of general-purpose microprocessors may comprise, a central processing unit (CPU) with data values encoded in an instruction register (or other circuitry maintaining instructions) or data values comprising memory locations, which in turn comprise values utilized as instructions. The memory locations may further comprise a memory location that is external to the CPU. Such CPU-external components may be embodied as one or more of a field-programmable gate array (FPGA), read-only memory (ROM), programmable read-only memory (PROM), erasable programmable read-only memory (EPROM), random access memory (RAM), bus-accessible storage, network-accessible storage, etc.

These machine-executable instructions may be stored on one or more machine-readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

In another embodiment, a microprocessor may be a system or collection of processing hardware components, such as a microprocessor on a client device and a microprocessor on a server, a collection of devices with their respective microprocessor, or a shared or remote processing service (e.g., "cloud" based microprocessor). A system of microprocessors may comprise task-specific allocation of processing tasks and/or shared or distributed processing tasks. In yet another embodiment, a microprocessor may execute software to provide the services to emulate a different microprocessor or microprocessors. As a result, first microprocessor, comprised of a first set of hardware components, may virtually provide the services of a second microprocessor whereby the hardware associated with the first microprocessor may operate using an instruction set associated with the second microprocessor.

While machine-executable instructions may be stored and executed locally to a particular machine (e.g., personal computer, mobile computing device, laptop, etc.), it should be appreciated that the storage of data and/or instructions and/or the execution of at least a portion of the instructions may be provided via connectivity to a remote data storage and/or processing device or collection of devices, commonly known as "the cloud," but may include a public, private, dedicated, shared and/or other service bureau, computing service, and/or "server farm."

Examples of the microprocessors as described herein may include, but are not limited to, at least one of Qualcomm® Snapdragon® 800 and 801, Qualcomm® Snapdragon® 610 and 615 with 4G LTE Integration and 64-bit computing, Apple® A7 microprocessor with 64-bit architecture, Apple® M7 motion comicroprocessors, Samsung® Exynos® series, the Intel® Core™ family of microprocessors, the Intel® Xeon® family of microprocessors, the Intel® Atom™ family of microprocessors, the Intel Itanium® family of microprocessors, Intel® Core® i5-4670K and i7-4770K 22 nm Haswell, Intel® Core® i5-3570K 22 nm Ivy Bridge, the AMD® FX™ family of microprocessors, AMD® FX-4300, FX-6300, and FX-8350 32 nm Vishera, AMD® Kaveri microprocessors, Texas Instruments® Jacinto C6000™ automotive infotainment microprocessors, Texas Instruments® OMAP™ automotive-grade mobile microprocessors, ARM® Cortex™-M microprocessors, ARM® Cortex-A and ARM926EJ-S™ microprocessors, other industry-equivalent microprocessors, and may perform computational functions using any known or future-developed standard, instruction set, libraries, and/or architecture.

Any of the steps, functions, and operations discussed herein can be performed continuously and automatically.

The exemplary systems and methods of this invention have been described in relation to communications systems and components and methods for monitoring, enhancing, and embellishing communications and messages. However, to avoid unnecessarily obscuring the present invention, the preceding description omits a number of known structures and devices. This omission is not to be construed as a limitation of the scope of the claimed invention. Specific details are set forth to provide an understanding of the present invention. It should, however, be appreciated that the present invention may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components or portions thereof (e.g., microprocessors, memory/storage, interfaces, etc.) of the system can be combined into one or more devices, such as a server, servers, computer, computing device, terminal, "cloud" or other distributed processing, or collocated on a particular node of a distributed network, such as an analog and/or digital telecommunications network, a packet-switched network, or a circuit-switched network. In another embodiment, the components may be physical or logically distributed across a plurality of components (e.g., a microprocessor may comprise a first microprocessor on one component and a second microprocessor on another component, each performing a portion of a shared task and/or an allocated task). It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the invention.

A number of variations and modifications of the invention can be used. It would be possible to provide for some features of the invention without providing others.

In yet another embodiment, the systems and methods of this invention can be implemented in conjunction with a special purpose computer, a programmed microprocessor or microcontroller and peripheral integrated circuit element(s), an ASIC or other integrated circuit, a digital signal microprocessor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this invention. Exemplary hardware that can be used for the present invention includes computers, handheld devices, telephones (e.g., cellular, Internet enabled, digital, analog, hybrids, and others), and other hardware known in the art. Some of these devices include microprocessors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein as provided by one or more processing components.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this invention can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Embodiments herein comprising software are executed, or stored for subsequent execution, by one or more microprocessors and are executed as executable code. The executable code being selected to execute instructions that comprise the particular embodiment. The instructions executed being a constrained set of instructions selected from the discrete set of native instructions understood by the microprocessor and, prior to execution, committed to microprocessor-accessible memory. In another embodiment, human-readable "source code" software, prior to execution by the one or more microprocessors, is first converted to system software to comprise a platform (e.g., computer, microprocessor, database, etc.) specific set of instructions selected from the platform's native instruction set.

Although the present invention describes components and functions implemented in the embodiments with reference to particular standards and protocols, the invention is not limited to such standards and protocols. Other similar standards and protocols not mentioned herein are in existence and are considered to be included in the present invention. Moreover, the standards and protocols mentioned herein, and other similar standards and protocols not mentioned herein, are periodically superseded by faster or more effective equivalents having essentially the same functions. Such replacement standards and protocols having the same functions are considered equivalents included in the present invention.

The present invention, in various embodiments, configurations, and aspects, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments, configurations, or aspects for the purpose of streamlining the disclosure. The features of the embodiments, configurations, or aspects of the invention may be combined in alternate embodiments, configurations, or aspects other than those discussed above. This method of disclosure is not to be interpreted as reflecting an intention that the claimed invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the invention.

Moreover, though the description of the invention has included description of one or more embodiments, configurations, or aspects and certain variations and modifications, other variations, combinations, and modifications are within the scope of the invention, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

What is claimed is:
1. A system, comprising:
a network interface to a network;
a memory;
a processor coupled to the memory programmed with executable instructions; and
wherein the processor executing the executable instructions performs:
receiving a communication comprising a customer communication device utilized by a customer and an automated resource holding the communication;

accessing a customer language proficiency rating of the customer and comprising a technical sophistication rating;

accessing a pool of language proficiency ratings associated with each agent in a pool of agents;

selecting an agent from the pool of agents that has an associated language proficiency rating comprising a technical sophistication rating that best matches the customer language proficiency rating; and connecting the communication to comprise an agent communication device associated with the selected agent.

2. The system of claim 1, wherein the processor executing the executable instructions performs accessing the customer language proficiency rating of the customer, further comprising:

determining the customer language proficiency rating of the customer, comprising:

accessing a scoring model having scored words;

prior to the communication, accessing a prior communication having content provided by the customer;

scoring the prior communication with the scoring model to determine a proficiency score of the communication; and making the proficiency score of the communication accessible as the customer language proficiency rating of the customer.

3. The system of claim 2, wherein the prior communication comprises one or more of a social media posting, email, text message, voice message, voice call, transcription of a message, or transcription of a voice call.

4. The system of claim 1, wherein the processor executing the executable instructions performs:

accessing the pool of language proficiency ratings associated with each agent in the pool of agents, comprising:

accessing a scoring model;

for each agent in the pool of agents:

prior to the communication, accessing a prior communication having content provided by ones of the agents in the pool of agents;

scoring a word within the prior communication against the scoring model;

determining an overall score; and making the overall score accessible as an entry in the pool of language proficiency ratings for each of the agents in the pool of agents.

5. The system of claim 1, wherein at least one of the customer language proficiency rating or ones of the pool of language proficiency ratings associated with each agent in the pool of agents, comprises one or more of a vocabulary rating, a pronunciation rating, a grammar rating, or a speed rating.

6. The system of claim 1, wherein selecting the agent from the pool of agents that has the associated language proficiency rating that best matches the customer language proficiency rating, further comprises the processor executing the executable instruction to perform:

accessing an acceptable range from the customer language proficiency rating; and selecting the agent from the pool of agents that has the associated language proficiency rating that is within the acceptable range.

7. The system of claim 1, wherein the best match is determined to be present when the agent from the pool of agents has the associated language proficiency equal to the customer language proficiency rating within a previously determined range.

8. The system of claim 1, wherein selecting the agent from the pool of agents that has the associated language proficiency rating that best matches the customer language proficiency rating, further comprises the processor executing the executable instruction to perform:

accessing a desired variation from the customer language proficiency rating; and selecting the agent from the pool of agents that has the associated language proficiency rating having the desired variation from the customer language proficiency rating.

9. A system, comprising:

a network interface to a network;

a memory;

a processor coupled to the memory programmed with executable instructions; and wherein the processor executing the executable instructions performs:

receiving a communication comprising customer content, from a customer utilizing a customer communication device, and agent content, from an agent utilizing an agent commination device;

accessing a customer language proficiency rating of the customer;

monitoring the agent content;

determining an agent language proficiency from the agent content;

determining whether the agent language proficiency is dissimilar from the customer language proficiency; and upon determining that the dissimilarity between the agent language proficiency and customer language proficiency is present, causing the agent communication device to present indicia of the dissimilarity.

10. The system of claim 9, wherein the processor executing the executable instructions performs accessing the customer language proficiency of the customer, comprising:

determining the customer language proficiency of the customer, comprising:

accessing a scoring model;

prior to the communication, accessing a prior communication having content provided by the customer; and scoring the prior communication with the scoring model to produce a customer language proficiency score.

11. The system of claim 10, wherein the prior communication comprises one or more of a social media posting, email, text message, voice message, voice call, transcription of a message, or transcription of a voice call.

12. The system of claim 9, wherein the processor executing the executable instructions performs determining the agent language proficiency from the agent content, further comprising:

accessing a scoring model; and scoring the agent content with the scoring model to produce the agent language proficiency.

13. The system of claim 9, wherein at least one of the customer language proficiency or the agent language proficiency, comprises one or more of a vocabulary rating, a technical sophistication rating, a fluency rating, a pronunciation rating, a grammar rating, or a speed rating.

14. The system of claim 9, wherein determining whether the agent language proficiency is dissimilar from the customer language proficiency, comprises determining whether at last one word of the words provided by the agent as a portion of the communication has an agent language proficiency rating is outside acceptable range from.

15. The system of claim 9, wherein the determining whether the agent language proficiency is dissimilar from the customer language proficiency, comprises determining an agent language proficiency scoring of at least one word of words provided by the agent as a portion of the communication being dissimilar from a customer language proficiency scoring of at least one word from at least one prior customer communication.

16. A computer-implemented method of training a neural network for language proficiency comprising:
 collecting a first set of words having a first language proficiency and a meaning;
 modifying the first set of words to a set of different words having a same meaning;
 creating a first training set comprising the first set of words, the different set of words, and a set of words having a different meaning;
 training the neural network in a first state using the first training set;
 creating a second training set for a second stage of training comprising the first training set and the different set of words incorrectly identified as being synonyms with the first set of words; and
 training the neural network in a second stage using the second training set.

17. The method of claim 16, further comprising:
 determining, with the neural network after the second stage of training, whether at last one word of words provided by an agent as a portion of a communication with a customer has a language proficiency dissimilar from a customer language proficiency, wherein the customer language proficiency is determined by utilizing a prior communication of the customer as a source of the first set of words; and
 causing a real-time presentation of the dissimilarity between the language proficiency of the at least one word of words and the customer language proficiency on an agent communication device during the communication.

18. The method of claim 17, further comprising, a real-time presentation of at least one alternative word selected from the second training set on the agent communication device.

19. The method of claim 17, wherein the prior communication comprises one or more of a social media posting, email, text message, voice message, voice call, transcription of a message, or transcription of a voice call.

20. The method of claim 17, wherein the first set of words having the language proficiency comprises at least one word having a language proficiency determined by a scoring model.

* * * * *

UNITED STATES PATENT AND TRADEMARK OFFICE
CERTIFICATE OF CORRECTION

| | | |
|---|---|---|
| PATENT NO. | : 11,316,979 B2 | Page 1 of 1 |
| APPLICATION NO. | : 16/984724 | |
| DATED | : April 26, 2022 | |
| INVENTOR(S) | : Valentine C. Matula et al. | |

It is certified that error appears in the above-identified patent and that said Letters Patent is hereby corrected as shown below:

In the Claims

At Column 43, Line 52, after "rating," please insert --a fluency rating-- therein.

At Column 46, Line 12, please delete "proficiciency" and insert --proficiency-- therein.

Signed and Sealed this
Ninth Day of August, 2022

Katherine Kelly Vidal
*Director of the United States Patent and Trademark Office*